(12) United States Patent
Miura et al.

(10) Patent No.: US 10,397,537 B2
(45) Date of Patent: Aug. 27, 2019

(54) VIDEO SIGNAL TRANSMISSION DEVICE, VIDEO SIGNAL RECEPTION DEVICE AND VIDEO SIGNAL TRANSFERRING SYSTEM

(71) Applicant: THINE ELECTRONICS, INC., Tokyo (JP)

(72) Inventors: Satoshi Miura, Tokyo (JP); Yoshimichi Murakami, Tokyo (JP); Shuhei Yamamoto, Tokyo (JP)

(73) Assignee: THINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 16/091,230

(22) PCT Filed: Apr. 6, 2017

(86) PCT No.: PCT/JP2017/014367
§ 371 (c)(1),
(2) Date: Oct. 4, 2018

(87) PCT Pub. No.: WO2017/175828
PCT Pub. Date: Oct. 12, 2017

(65) Prior Publication Data
US 2019/0158798 A1 May 23, 2019

(30) Foreign Application Priority Data
Apr. 7, 2016 (JP) ................. 2016-077318

(51) Int. Cl.
*H04N 5/04* (2006.01)
*H04N 11/24* (2006.01)
*H04N 11/06* (2006.01)

(52) U.S. Cl.
CPC ............... *H04N 11/06* (2013.01); *H04N 5/04* (2013.01); *H04N 11/24* (2019.01)

(58) Field of Classification Search
CPC ....................................................... H03K 7/10
See application file for complete search history.

(56) References Cited

U.S. PATENT DOCUMENTS

2005/0286643 A1* 12/2005 Ozawa ................... H03L 7/087
375/242

FOREIGN PATENT DOCUMENTS

| JP | 2005-311879 A | 11/2005 |
|----|---------------|---------|
| JP | 2009-135801 A | 6/2009  |
| JP | 4805900 B2    | 11/2011 |

OTHER PUBLICATIONS

International Search Report dated Jun. 27, 2017 issued by the International Searching Authority in PCT/JP2017/014367.
(Continued)

*Primary Examiner* — Paulos M Natnael
(74) *Attorney, Agent, or Firm* — Sughrue Mion, PLLC

(57) ABSTRACT

The present invention relates to a video signal transmission device and the like that can support a variety of system specifications. The device includes a packer unit, an encoder unit, and a serializer. The packer unit generates, from a video signal of one or more pixels, a plurality of block signals having a packet configuration of size corresponding to the number of pixels and the number of tone bits of a color signal constituting a video signal. At this time, a control signal including a pulse having a width corresponding to the number of pixels and the number of tone bits is also generated. The encoder unit applies encoding processing having encoding efficiencies that are different between a first period and a second period of a control signal that are distinguished depending on existence or non-existence of a pulse to the block signals.

22 Claims, 16 Drawing Sheets

(56) References Cited

OTHER PUBLICATIONS

International Preliminary Report on Patentability with the translation of Written Opinion dated Oct. 18, 2018 issued by the International Bureau in PCT/JP2017/014367.

* cited by examiner

Fig.6

| SET VALUE M FOR NUMBER OF BLOCKS / SET VALUE N FOR NUMBER OF PIXELS | 3 block/pixel | 4 block/pixel | 5 block/pixel |
|---|---|---|---|
| 1 pixel/packet | 3 block | 4 block | 5 block |
| 2 pixel/packet | 6 block | 8 block | 10 block |
| 4 pixel/packet | 12 block | 16 block | 20 block |
| 8 pixel/packet | 24 block | 32 block | 40 block |
| ... | ... | ... | ... |

Fig. 7

| SET VALUE M FOR NUMBER OF BLOCKS / SET VALUE N FOR NUMBER OF PIXELS | 3 block/pixel | 4 block/pixel | 5 block/pixel |
|---|---|---|---|
| 1 pixel/packet | 3 block | 4 block | 5 block |
| ⋮ | ⋮ | ⋮ | ⋮ |
| N pixel/packet | 3 block | 4 block | 5 block |

VIDEO SIGNAL TRANSMISSION DEVICE, VIDEO SIGNAL RECEPTION DEVICE AND VIDEO SIGNAL TRANSFERRING SYSTEM

CROSS REFERENCE TO RELATED APPLICATIONS

This application is a National Stage of International Application No. PCT/JP2017/014367 filed Apr. 6, 2017, claiming priority based on Japanese Patent Application No. 2016-077318 filed Apr. 7, 2016.

TECHNICAL FIELD

The present invention relates to a video signal transmission device, a video signal receiving device, and a video signal transmission system including the devices.

BACKGROUND ART

When video is displayed on a video displaying device including a display, such as a liquid crystal display (LCD) or a plasma display panel (PDP), a video signal transmission device transmits a video signal and the like (including a video signal including an RGB color signal and a sync signal for control, as well as a data enable signal) to a video signal receiving device, and the video signal receiving device provides the video display device with the video signal and the like. For example, a television receiver includes a video signal transmission system that includes a video signal transmission device and a video signal receiving device such as those described above.

In a video signal transmission system, when an amount of signal transmission (data transmission rate) per unit time is increased, the number of wires used between a video signal transmission device and a video signal receiving device can be reduced. An invention that makes the above possible is disclosed in Patent Document 1.

CITATION LIST

Patent Literature

Patent Document 1: Japanese Patent Application Laid-Open No. 2009-135801

SUMMARY OF INVENTION

Technical Problem

As a result of studying the prior art described above, the inventors have found a problem described below. That is, a display of a video displaying device is required to have a higher definition, a higher refresh rate, and a larger number of tones in order to display a more beautiful image. For the above reason, a variety of specifications are set for commercialized displays, and a variety of specifications are also set for displays that are being developed.

For example, displays having a large number of pixels, such as full high definition (FHD), 4K2K, and 8K4K, have been standardized, and diversification in image quality has been promoted. The number of pixels of 4K2K is four times as large as that of FHD. The number of pixels of 8K4K is four times as large as that of 4K2K.

Displays of 5K and 10K, which are horizontally longer than normal ones, have been standardized as a display suitable for displaying video of a movie and the like. As described above, diversification in display systems relating to a ratio between numbers of horizontal and vertical pixels has also been promoted.

Further, diversification in physical forms of television receivers has also been promoted. For example, there are displays having a variety of sizes ranging from a small display to a large display. There is an all-in-one model in which a display and a receiver are integrated, as well as a separated model in which a display and a receiver are separated from each other. As described above, television receivers in a variety of forms have been developed and commercialized depending on uses.

In view of the above tendency of diversification in television receivers in various aspects, a manufacturer of television receivers increasingly needs to develop television receives in a variety of specifications. Along with the above, required specifications of a video signal transmission system used in a television receiver have also been diversified. For example, diversification in image quality and diversification in display systems lead to diversification in data transmission rates in a video signal transmission system. Diversification in display systems and diversification in forms lead to diversification in physical transmission distances of a video signal and the like in a video signal transmission system.

When a video signal transmission system is designed, it is important to manufacture a board and the like having a configuration that satisfies required specifications in consideration of optimizing cost, power consumption, and the number of wires. However, when dedicated boards corresponding to a variety of required specifications are manufactured, total cost of design and manufacture may be increased, and power consumption may also be increased. Such a tendency toward increase in cost appears significantly, especially in the early days of the spread of a certain product with new specifications. Increase in cost may also lower motivation of a manufacturer for developing and commercializing a television receiver with new specifications.

The invention disclosed in Patent Document 1 mentioned above can handle increase in the number of tones of a video signal by restricting increase in the number of wires between a video signal transmission device and a video signal receiving device, and, in this respect, can restrict increase in cost. However, the invention disclosed in Patent Document 1 may cause the number of wires to be increased when an attempt is made to handle a variety of required specifications relating to, for example, the number of pixels and an aspect ratio.

The present invention is made to solve the above problems. An object of the present invention is to provide a video signal transmission device, a video signal receiving device, and a video signal transmission system including these devices that can handle a variety of specifications required for the video signal transmission system.

Solution to Problem

A video signal transmission device according to the present embodiment at least includes a packer unit, an encoder unit, and a serializer. The packer unit captures a video signal constituted by one or more pixel signals and a data enable signal. Each of pixel signals constituting the video signal corresponds to one pixel, and includes a color signal and a sync signal. The packer unit also generates a plurality of block signals by applying packetizing processing to a video signal in accordance with a data enable signal so that a captured video signal has a packet configuration of size corresponding to the number of pixels per video signal and the number of tone bits of a color signal. The encoder unit applies encoding processing to a plurality of block signals to generate a plurality of encoded block signals. The serializer applies parallel-serial conversion to a plurality of encoded block signals to generate a serial signal.

As an example, the packer unit preferably generates a control signal including a pulse having a pulse width corresponding to the number of pixels per captured video signal and the number of tone bits of a color signal. The encoder unit preferably performs encoding processing having encoding efficiencies that are different between a first period of a control signal in which a pulse exists and a second period of a control signal that is distinguished from the first period depending on existence or non-existence of a pulse.

Advantageous Effects of Invention

According to a video signal transmission device, a video signal receiving device, and a video signal transmission system according to the present embodiment, a variety of specifications required for the video signal transmission system can be supported.

BRIEF DESCRIPTION OF DRAWINGS

FIG. 6 is a table that shows a relationship between a set value N for the number of pixels and a set value M for the number of blocks and a pulse width of a control signal in a case of a second mode in which an unpacker unit 21 is provided with the set value N for the number of pixels and the set value M for the number of blocks.

FIG. 7 is a table that shows a relationship between the set value N for the number of pixels and the set value M for the number of blocks and a pulse width of a control signal in a case of a third mode in which the unpacker unit 21 is provided with the set value N for the number of pixels and the set value M for the number of blocks.

DESCRIPTION OF EMBODIMENTS

Figure 1:
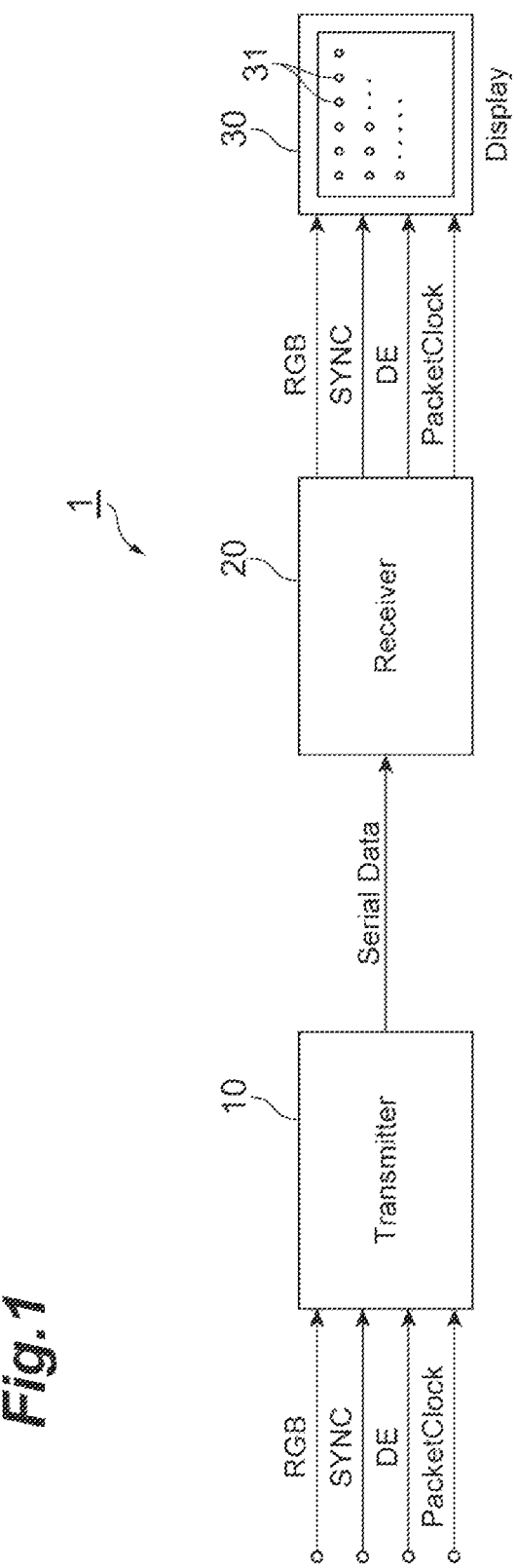
FIG. 1 is a diagram showing a configuration example of a video signal transmission system 1 according to the present embodiment.

Explanation of an Embodiment of the Present Invention

First, contents of an embodiment of the present invention will be listed and described individually.

(1) A video signal transmission device according to the present embodiment at least includes a packer unit, an encoder unit, and a serializer. The packer unit captures a video signal constituted by one or more pixel signals and a data enable signal. Each of pixel signals constituting the video signal corresponds to one pixel, and includes a color signal and a sync signal. The packer unit also generates a plurality of block signals by applying packetizing processing to a video signal in accordance with a data enable signal so that a captured video signal has a packet configuration of size corresponding to the number of pixels per video signal and the number of tone bits of a color signal. Specifically, in packetization (generation of a plurality of block signals) of a video signal, a plurality of intermediate packets is generated when a captured video signal is packetized in accordance with a data enable signal so that the video signal has a packet configuration of size corresponding to the number of pixels per video signal. Further, a plurality of block signals is generated when each of the plurality of intermediate packets is packetized in accordance with a data enable signal so that each of the plurality of intermediate packets has a packet configuration of size corresponding to the number of tone bits of a color signal. The encoder unit applies encoding processing to a plurality of block signals to generate a plurality of encoded block signals. The serializer applies parallel-serial conversion to a plurality of encoded block signals to generate a serial signal.

(2) As a mode of the present embodiment, the packer unit preferably generates a control signal including a pulse having a pulse width corresponding to the number of pixels per captured video signal and the number of tone bits of a color signal. The encoder unit preferably performs encoding processing having encoding efficiencies that are different between a first period of a control signal in which a pulse exists and a second period of a control signal that is distinguished from the first period depending on existence or non-existence of a pulse.

(2) As a mode of the present embodiment, the packer unit may generate a control signal including a pulse having a pulse width corresponding to the number of tone bits of a color signal. In this case, information on the number of pixels is included in each of block signals generated in the first period in which a pulse exists in the control signal among a plurality of block signals. The encoder unit may perform encoding processing having encoding efficiencies that are different between the first period of a control signal and the second period of a control signal that is distinguished from the first period depending on existence or non-existence of a pulse.

(3) As a mode of the present embodiment, the encoder unit may include a scrambler and an encoder. The scrambler applies scrambling processing only in the second period to a plurality of block signals generated by the packer unit. The encoder applies encoding processing of encoding efficiencies that are different between the first period and the second period to a plurality of block signals to which the scrambling processing has been applied.

(4) As a mode of the present embodiment, the encoder unit may select any of a plurality of encoding efficiencies set in advance for encoding processing. As a mode of the present embodiment, the serializer preferably has an adjustable waveform equalization function or an adjustable output signal amplitude adjusting function.

(5) A video signal receiving device according to the present embodiment at least includes a de-serializer, a decoder unit, and an unpacker unit. The de-serializer captures a serial signal outputted from the video signal transmission device according to at least any mode of a variety of the modes described above, and applies serial-parallel conversion to the serial signal so as to reproduce a plurality of encoded block signals. The decoder unit applies decoding processing to a plurality of encoded block signals to reproduce a plurality of block signals. The unpacker unit applies unpacketizing processing to a plurality of block signals to reproduce a video signal constituted by one or more pixel signals, each of which corresponds to one pixel and includes a color signal and a sync signal, and a data enable signal.

(6) As a mode of the present embodiment, the decoder unit identifies an encoded block signal of the first period and an encoded block signal of the second period, the encoded block signals to which encoding processing of different encoding efficiencies is applied, from a plurality of encoded block signals. Further, the decoder unit reproduces a control signal including a pulse having a pulse width corresponding to the first period, and applies decoding processing of decoding efficiencies that are different between the first period and the second period to a plurality of encoded block signals. In this case, as a mode of the present embodiment, the unpacker unit may perform unpacketizing processing by using set values of the number of pixels per captured video signal and the number of tone bits of a color signal. As a mode of the present embodiment, the unpacker unit may perform unpacketizing processing by using the number of pixels and the number of tone bits of a color signal which are obtained from a pulse width of a pulse of a control signal. As a mode of the present embodiment, the unpacker unit may perform unpacketizing processing by using the number of tone bits of a color signal obtained from a pulse width of a pulse of a control signal and the number of pixels obtained from a block signal of the first period among a plurality of block signals.

(7) As a mode of the present embodiment, the decoder unit may include a decoder and a de-scrambler. The decoder applies decoding processing having decoding efficiencies which are different between the first period and the second period to a plurality of encoded block signals. The de-scrambler applies de-scrambling processing only in the second period to a plurality of encoded block signals to which the decoding processing has been applied.

(8) As a mode of the present embodiment, the decoder unit may select any of a plurality of decoding efficiencies set in advance for decoding processing. As a mode of the present embodiment, the de-serializer preferably has an adjustable waveform equalization function.

(9) The video signal transmission system according to the present embodiment preferably includes the video signal transmission device according to at least any mode of a variety of the modes described above and the video signal receiving device according to at least any mode of a variety of the modes described above.

The modes listed above in the section of [Explanation of embodiment of the present invention] are applicable to each of all remaining modes or to all combinations of such remaining modes.

DETAILS OF EMBODIMENT OF THE PRESENT INVENTION

Hereinafter, a specific structure of the video signal transmission device, the video signal receiving device, and the video signal transmission system according to the present embodiment will be described in detail with reference to the attached drawings. The present invention is not limited by these exemplifications, and is intended to be shown by claims and include all changes made within the meaning and the scope equal to those of claims. The same elements will be attached with the same reference signs in description of drawings to omit duplicate description.

FIG. 1 is a diagram showing a configuration example of a video signal transmission system 1. The video signal transmission system 1 includes a video signal transmission device (Transmitter) 10 and a video signal receiving device (Receiver) 20.

The video signal transmission device 10 receives a video signal (color signal (RGB) and a sync signal (SYNC)), a data enable signal (DE), and a packet clock (Packet Clock), and outputs a serial signal (Serial Data). Specifically, the video signal transmission device 10 applies packetizing processing to a video signal in accordance with a data enable signal. Further, after applying encoding processing to a video signal to which the packetizing processing has been applied, the video signal transmission device 10 applies parallel-serial conversion to the video signal to which the encoding processing has been applied.

The video signal receiving device 20 receives a serial signal outputted from the video signal transmission device 10 and applies serial-parallel conversion to the serial signal. After that, the video signal receiving device 20 performs decoding processing and unpacketizing processing to reproduce a video signal (the color signal (RGB) and the sync signal (SYNC)) and the data enable signal (DE). The reproduced signals are supplied to a video displaying device, such as a display 30, having a plurality of pixels 31.

The color signal (RGB) and the sync signal (SYNC) constitute a video signal. The color signal is a signal that shows a tone (color depth) of each of colors, red (R), green (G), and blue (B), for each pixel. The sync signal is a signal for control used when video is displayed on a video displaying device. In general, when the data enable signal (DE) is at a high level, a video signal only includes the color signal, and the sync signal may be indefinite. When the data enable signal (DE) is at a low level, a video signal only includes the sync signal, and the color signal may be indefinite. The sync signal has a small amount of information as compared to the color signal. Accordingly, when the data enable signal (DE) is at a low level, the video signal transmission device 10 can send additional information in addition to the sync signal to the video signal receiving device 20.

Figure 2:
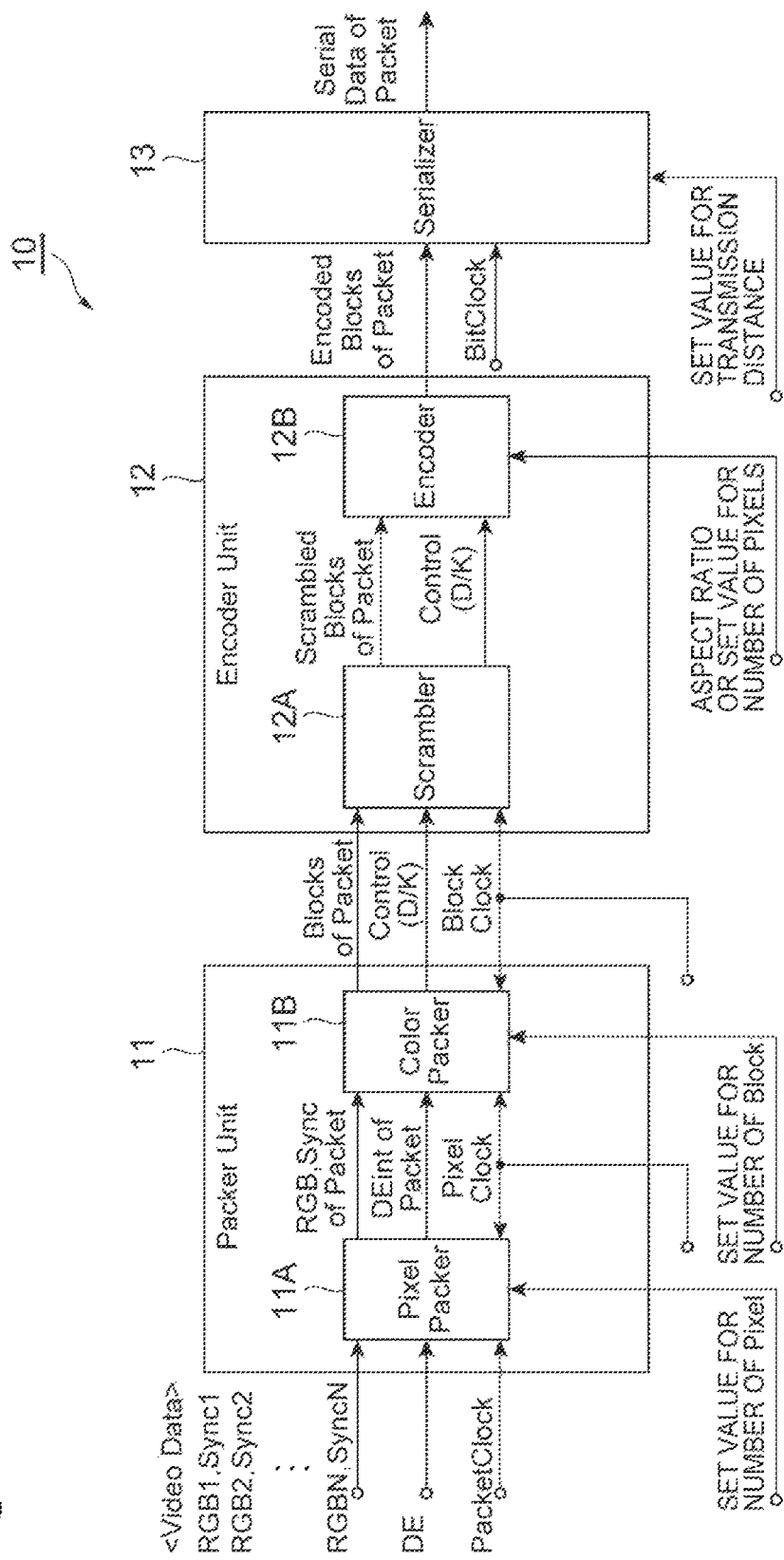
FIG. 2 is a diagram showing a configuration example of a video signal transmission device 10 according to the present embodiment.
Figure 3:
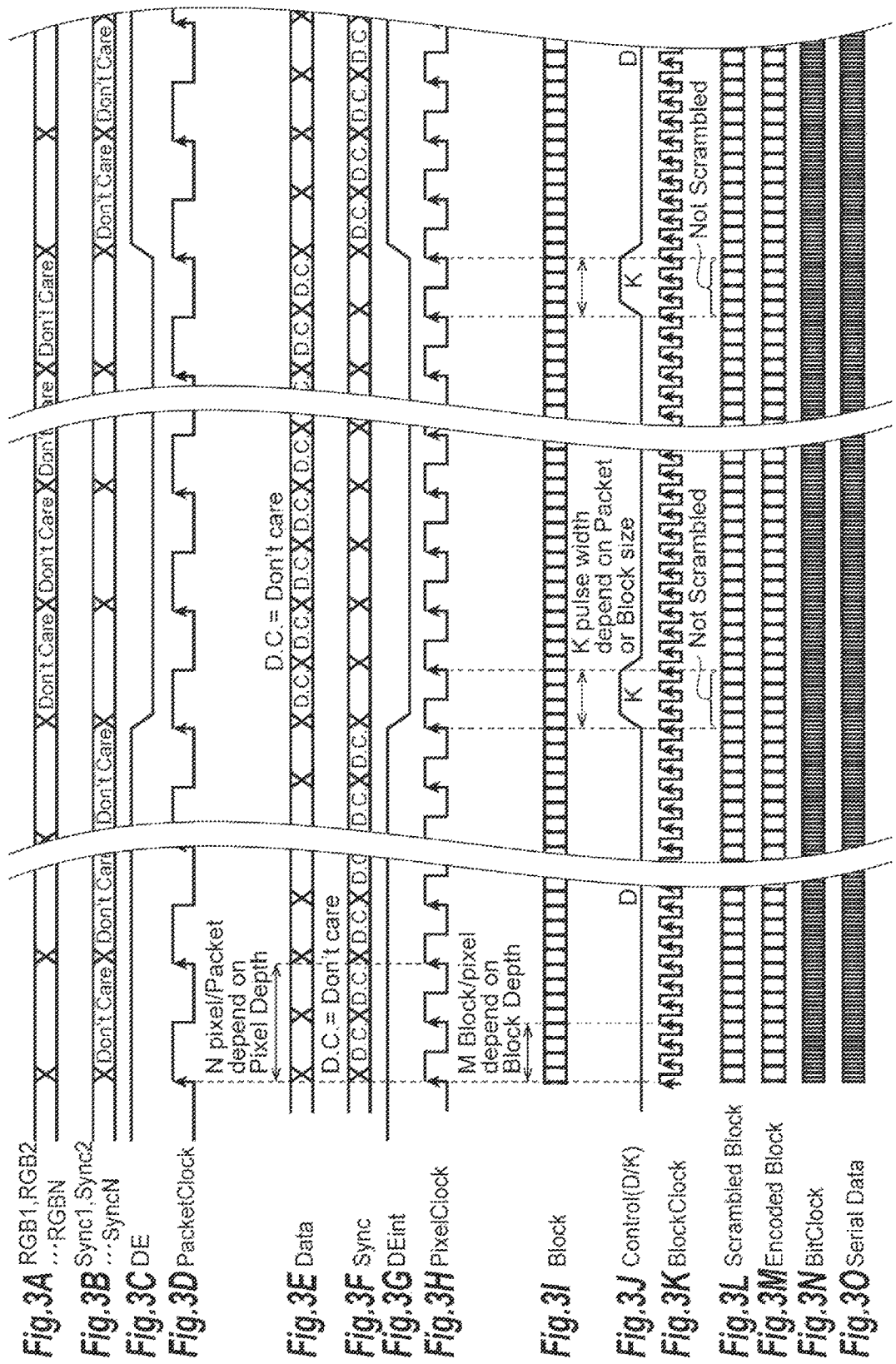
FIGS. 3A to 3O are timing charts of signals in the video signal transmission device 10.

FIG. 2 is a diagram showing a configuration example of the video signal transmission device 10. FIGS. 3A to 3O are timing charts of signals in the video signal transmission device 10. The video signal transmission device 10 includes a packer unit (Packer Unit) 11, an encoder unit (Encoder Unit) 12, and a serializer (Serializer) 13. The packer unit 11 includes a pixel packer (Pixel Packer) 11A and a color packer (Color Packer) 11B. The encoder unit 12 includes a scrambler (Scrambler) 12A and an encoder (Encoder) 12B.

The pixel packer 11A receives input of signals (Video Data and DE) in synchronization with a packet clock (Packet Clock), and outputs signals (RGB, Sync of Packet, and DEint of Packet) in synchronization with a pixel clock (Pixel Clock). The color packer 11B receives input of signals from the pixel packer 11A in synchronization with a pixel clock, and outputs signals (Blocks of Packet and Control (D/K)) in synchronization with a block clock (Block Clock). The encoder unit 12 receives input of and outputs signals from the color packer 11B in synchronization with a block clock. The serializer 13 receives input of a signal (Encoded Blocks of Packet) from the encoder unit 12 in synchronization with a block clock, and outputs a signal (Serial Data of Packet) in synchronization with a bit clock (Bit Clock).

The packet clock (FIG. 3D), the pixel clock (FIG. 3H), the block clock (FIG. 3K), and the bit clock (FIG. 3N) have frequencies which are higher in this order in accordance with progress of multiplexing processing of a video signal. As described below, a set value for the number of pixels is set to N, a set value for the number of blocks is set to M, and the number of bits of a block signal is set to B. A frequency of the pixel clock is N times as high as a frequency of the packet clock. A frequency of the block clock is M times as high as the frequency of the pixel clock. A frequency of the bit clock is B times as high as the frequency of the block clock.

The packer unit 11 captures color signals (RGB1 to RGBN) and sync signals (Sync1 to SyncN) constituting a video signal (Video Data) having the number N of pixels, the data enable signal (DE), the set value N for the number of pixels, and the set value M for the number of blocks (FIGS. 3A to 3C). Each of sets of a color signal and a sync signal, (RGB1, Sync1), (RGB2, Sync2), . . . , (RGBN, SyncN), is included in a pixel signal corresponding to one pixel. In an example of FIG. 2, N pixels signals constitute a video signal captured by the pixel packer 11A. The set value N [pixel/packet] for the number of pixels shows the number of pixels (the number of pixel signals) included in one packet (a video signal captured by the pixel packer 11A), and is 1 or 2 or larger. The set value M [block/pixel] for the number of blocks shows the number of blocks required for expressing a tone of RGB of one pixel (each pixel signal). For example, when the number of bits of one block is 8 and a tone of each color is expressed by 10 bits, 30 bits are necessary to express a tone of RGB of one pixel. Accordingly, in this case, the set value M for the number of blocks is 4. The number of blocks included in one packet is NM.

The packer unit 11 generates a plurality of block signals (Blocks of Packet) by applying packetizing processing to a video signal in accordance with a data enable signal so that the video signal has a packet configuration of size corresponding to the set value N for the number of pixels and the set value M for the number of blocks (a value corresponding to the number of tone bits of a color signal) (FIG. 3I). The packer unit 11 also generates a control signal (Control(D/K)) including a pulse having a pulse width corresponding to the set value N for the number of pixels and the set value M for the number of blocks (or a pulse width corresponding to the set value M for the number of blocks) (FIG. 3J).

Specifically, the pixel packer 11A applies packetizing processing to a video signal (FIGS. 3A and 3B) in accordance with the data enable signal (FIG. 3C) so that the video signal has a packet configuration of size corresponding to the set value N for the number of pixels. (FIGS. 3E and 3F). Further, the color packer 11B applies packetizing processing to data (RGB, Sync of Packet, FIG. 3E) in accordance with the data enable signal (DEint of Packet, FIG. 3G) so that the data (FIG. 3E) has a packet configuration of size corresponding to the set value M for the number of blocks.

The encoder unit 12 generates a plurality of encoded block signals (Encoded Blocks of Packet) by applying encoding processing to a plurality of block signals (Blocks of Packet) generated by the packer unit 11 (FIG. 3M). The encoder unit 12 performs encoding processing that is different between the first period (period K in FIG. 3J) of the control signal (Control(D/K)) in which a pulse exists and the second period (period D in FIG. 3J) of the control signal in which no pulse exists.

Specifically, the scrambler 12A does not apply scrambling processing in the first period (period K) to a block signal (Blocks of Packet) generated by the packer unit 11, while the scrambler 12A applies scrambling processing in the second period (period D), so as to output a scrambled block signal (Scrambled Blocks of Packet) (FIG. 3L). The scrambler 12A includes a random number generator, and performs scrambling processing by using a random number generated by the random number generator.

The encoder 12B receives input of data (an aspect ratio or a set value for the number of pixels of the display 30) relating to an amount of information of a video signal, and applies encoding processing of encoding efficiencies which are different between the first period (period K) and the second period (period D) to a scrambled block signal (Scrambled Blocks of Packet) outputted from the scrambler 12A, so as to generate a plurality of encoded block signals (Encoded Blocks of Packet) (FIG. 3M). For example, when performing encoding processing of 8B10B, the encoder 12B performs the encoding processing in accordance with mapping for the period K in the first period (period K), and in accordance with mapping for the period D in the second period (period D).

The serializer 13 limits a waveform equalization function or adjusts an output signal amplitude based on a set value for a transmission distance that is inputted. The serializer 13 also generates a serial signal (Serial Data of Packet) by applying parallel-serial conversion to a plurality of encoded block signals (Encoded Blocks of Packet) generated by the encoder unit 12 based on the set value for a transmission distance (FIG. 3O).

Figure 4:
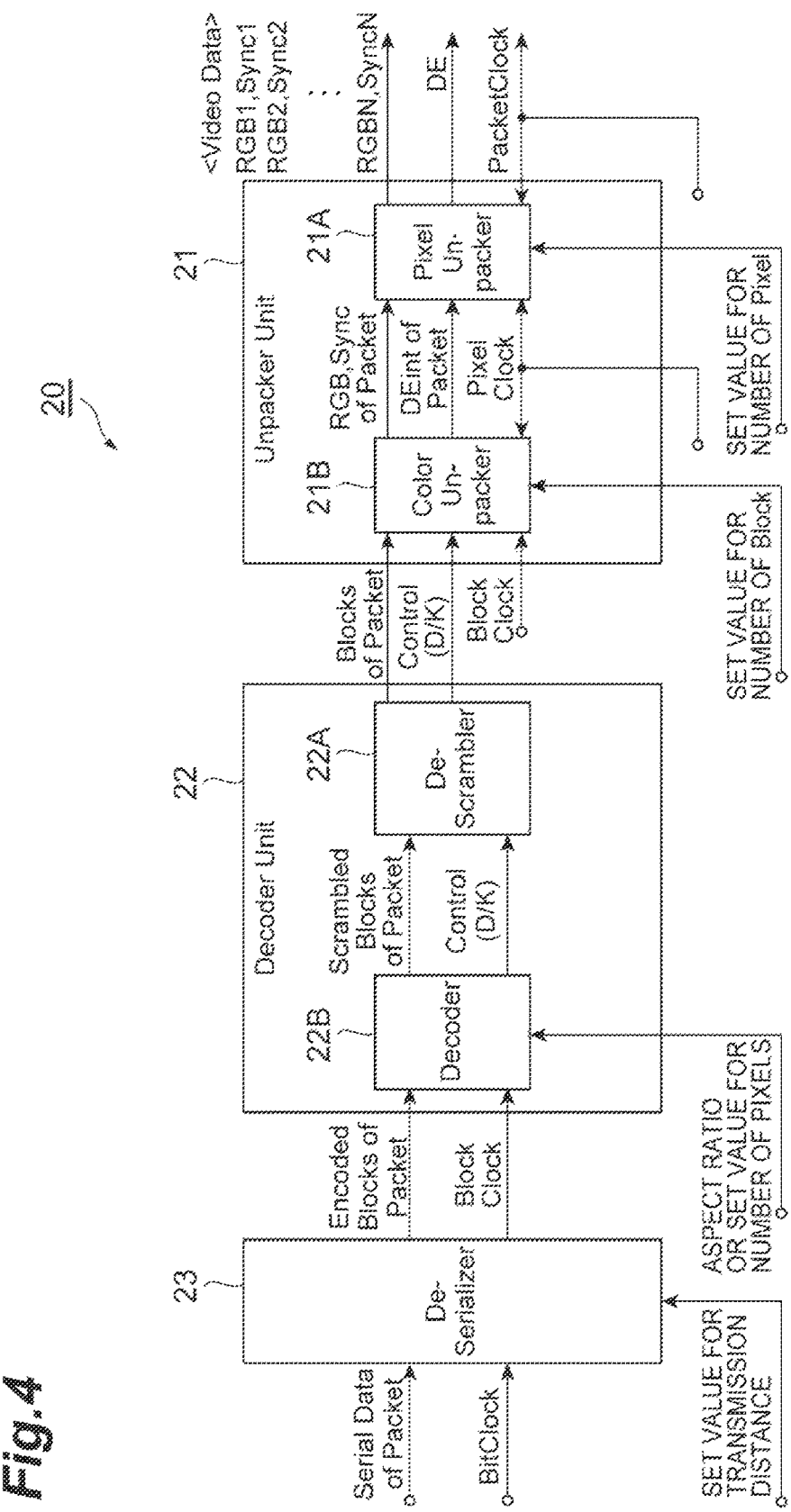
FIG. 4 is a diagram showing a configuration example of a video signal receiving device 20 according to the present embodiment.
Figure 5:
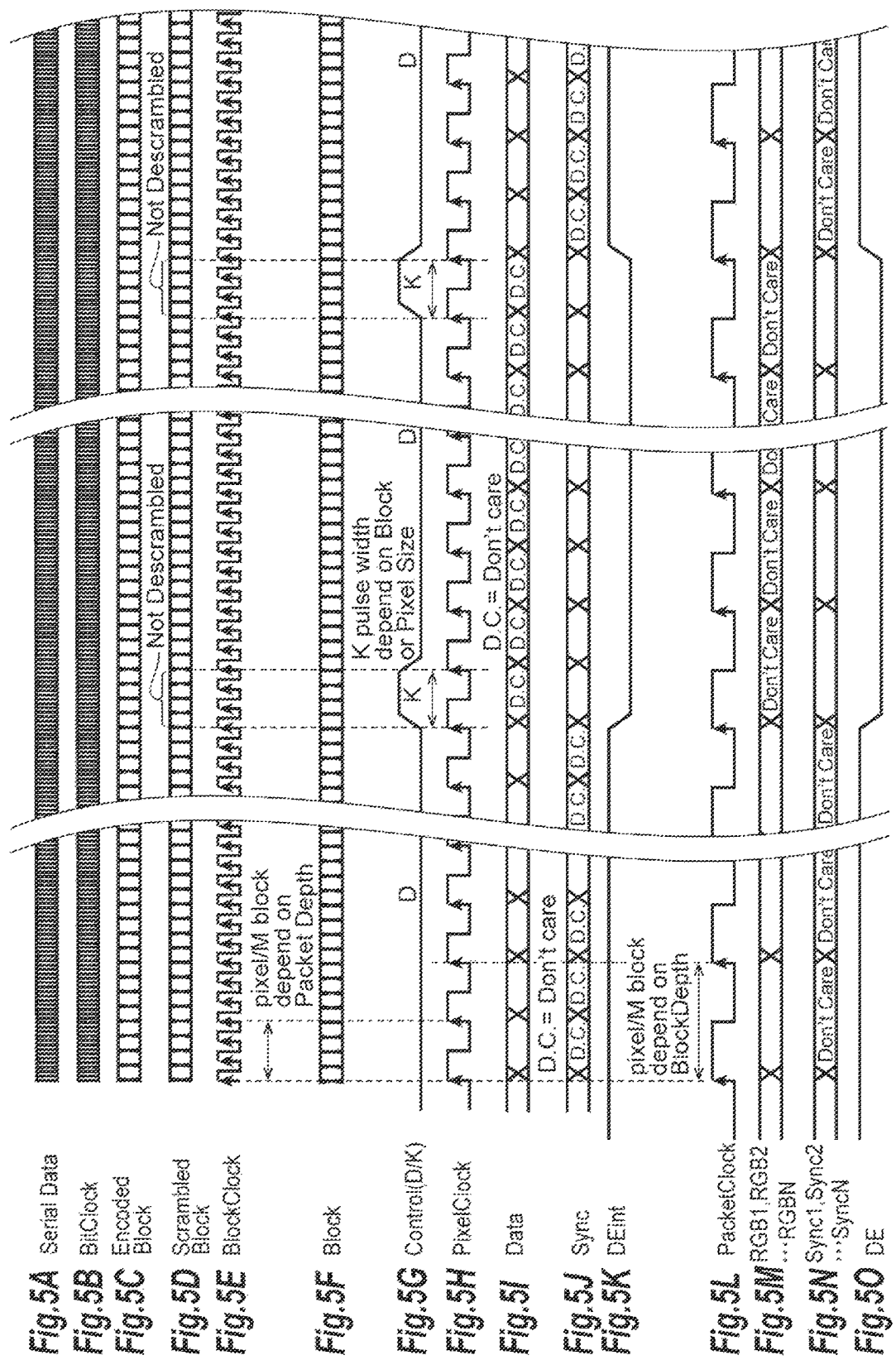
FIGS. 5A to 5O are timing charts of signals in the video signal receiving device 20.

FIG. 4 is a diagram showing a configuration example of the video signal receiving device 20. FIGS. 5A to 5O are timing charts of signals in the video signal receiving device 20. The video signal receiving device 20 includes an unpacker unit (Unpacker Unit) 21, a decoder unit (Decoder Unit) 22, and a de-serializer (De-Serialized) 23. The unpacker unit 21 includes a pixel unpacker (Pixel Unpacker) 21A and a color unpacker (Color Unpacker) 21B. The decoder unit 22 includes a de-scrambler (De-Scrambler) 22A and a decoder (Decoder) 22B.

The de-serializer 23 receives input of a signal (Serial Data of Packet) in synchronization with a bit clock (Bit Clock), and outputs a signal (Encoded Blocks of Packet) in synchronization with a block clock (Block Clock). The decoder unit 22 receives input of and outputs a signal in synchronization with a block clock. The color unpacker 21B receives input of a signal (Blocks of Packet and Control (D/K)) from the decoder unit 22 in synchronization with a block clock, and outputs a signal (RGB, Sync of Packet, and DEint of Packet) in synchronization with a pixel clock (Pixel Clock). The pixel unpacker 21A receives input of a signal from the color unpacker 21B in synchronization with a pixel clock, and outputs a signal (Video Data and DE) in synchronization with a packet clock (Packet Clock).

Frequencies of the bit clock (FIG. 5B), the block clock (FIG. 5E), the pixel clock (FIG. 5H), and the packet clock (FIG. 5I) are as described above.

The de-serializer 23 limits a waveform equalization function or adjusts an output signal amplitude based on a set value for a transmission distance that is inputted. The de-serializer 23 also reproduces a plurality of encoded block signals (Encoded Blocks of Packet) by receiving a serial signal (Serial Data) outputted from the video signal transmission device 10 and applying serial-parallel conversion to the serial signal (FIGS. 5A and 5C). The de-serializer 23 has, for example, a clock data recovery (CDR) function, and preferably reconstructs a bit clock (Bit Clock) and serial data based on a serial signal.

The decoder unit 22 reproduces a plurality of block signals (Blocks of Packet) by applying decoding processing to a plurality of encoded block signals (Encoded Blocks of Packet) reproduced by the de-serializer 23 (FIG. 5F). The decoder unit 22 identifies an encoded block signal of the first period and an encoded block signal of the second period, the encoded block signals to which encoding processing of different encoding efficiencies is applied, in encoded block signals. Further, the decoder unit 22 reproduces a control signal (Control(D/K)) including a pulse having a pulse width corresponding to the first period (FIG. 5G). The decoder unit 22 applies decoding processing having decoding efficiencies which are different between the first period (period K) and the second period (period D).

Specifically, the decoder 22B receives input of data (an aspect ratio or a set value for the number of pixels of the display 30) relating to an amount of information of a video signal, and applies decoding processing of decoding efficiencies which are different between the first period (period K) and the second period (period D) to encoded block signals (Encoded Blocks of Packet) reproduced by the de-serializer 23, so as to output a plurality of scrambled block signals (Scrambled Blocks of Packet) (FIG. 5D). For example, when performing decoding processing of 8B10B, the decoder 22B performs the decoding processing in accordance with mapping for the period K for the first period (period K), and in accordance with mapping for the period D for the second period (period D).

The de-scrambler 22A does not apply de-scrambling processing in the first period (period K) to scrambled block signals (Scrambled Blocks of Packet) outputted from the decoder 22B, while the de-scrambler 22A applies de-scrambling processing in the second period (period D), so as to reproduce block signals (Blocks of Packet) (FIG. 5F). The de-scrambler 22A includes a random number generator that is similar to the random number generator included in the scrambler 12A, and performs de-scrambling processing by using a random number generated by the random number generator.

The unpacker unit 21 applies unpacketizing processing based on the set value N for the number of pixels and the set value M for the number of blocks (a value corresponding to the number of tone bits of a color signal) to a plurality of block signals (Blocks of Packet) reproduced by the decoder unit 22, so as to reproduce the color signals (RGB1 to RGBN) and the sync signals (Sync1 to SyncN) constituting a video signal (Video Data) of the number N of pixels and also reproduce the data enable signal (DE) (FIGS. 5M to 5O).

Specifically, the color unpacker 21B applies unpacketizing processing based on the set value M for the number of blocks to a plurality of block signals (Blocks of Packet) reproduced by the decoder unit 22, so as to generate data (RGB, Sync of Packet) and a data enable signal (DEint of Packet) (FIGS. 5I, 5J, and 5K). Further, the pixel unpacker 21A applies unpacketizing processing based on the set value N for the number of pixels to the signal (FIGS. 5I and 5J) from the color unpacker 21B, so as to reproduce the video signal (Video Data) constituted by a color signal (FIG. 5M) and a sync signal (FIG. 5N) and a data enable signal (FIG. 5O).

The encoder unit 12 preferably performs encoding processing of encoding efficiencies corresponding to an amount of information (an aspect ratio or a set value for the number of pixels) or physical restriction of a video signal. In accordance with the encoder unit 12, the decoder unit 22 preferably performs decoding processing of decoding efficiencies corresponding to an amount of information (an aspect ratio or a set value for the number of pixels) or physical restriction of a video signal. For example, the encoder unit 12 preferably selects any of a plurality of encoding efficiencies set in advance. The decoder unit 22 preferably selects any of a plurality of decoding efficiencies set in advance.

The physical restriction includes, for example, a maximum frequency of a phase lock loop (PLL) that generates each clock, an oscillation frequency range, cable quality of a transmission path, and a defect of a transmission path. Now, a case where a video signal of 24 bits/pixel is transmitted at a pixel clock of 100 MHz will be considered. Assume that two types of encoding systems, 8B10B and 24B26B, are prepared. In the 8B10B encoding system, a bit rate after encoding is 3 Gbps, and clock generation that controls 3 Gbps needs to be performed by a PLL (in an extreme example, a PLL that generates a clock of 1.5 GHz from a clock of 100 MHz is necessary). In the 24B26B encoding system, a bit rate after encoding is 2.6 Gbps, and clock generation that controls 2.6 Gbps needs to be performed by a PLL (in an extreme example, a PLL that generates a clock of 1.3 GHz from a clock of 100 MHz is necessary).

In general, operation stability of a voltage control oscillator, a phase comparator, and a low-pass filter, which are main constituents of a PLL, is easier to ensure as an operation frequency is lower. These components can reduce power consumption and unnecessary radiation. Even when 1.5 GHz is difficult to achieve as a maximum frequency of a PLL in the 8B10B encoding system, transmission can be performed at 1.3 GHz in the 24B26B encoding system. As to an oscillation frequency range of a PLL where 600 MHz is assumed to be necessary as a lower limit frequency, an operation range of 600 MHz to 1.5 GHz is required in the 8B10B encoding system, whereas a narrower operation range of 600 MHz to 1.3 GHz is required in the 24B26B encoding system.

As to cable quality, since a transmittable bit rate and a cable cost are almost in a proportional relationship, a cable cost is preferably reduced by selecting cable quality corresponding to a bit rate. If cable cost is reduced by lowering a bit rate, a distortion of a transmission path tends to be large. In the 8B10B encoding system, while signal redundancy is 25%, a run length is 5 or smaller. Accordingly, there is an advantage that data error determination can be performed instantly. Since the run length is small, the system has a characteristic of reducing an inter-symbol interference jitter.

The serializer 13 preferably has an adjustable waveform equalization function or an adjustable output signal amplitude adjusting function. The de-serializer 23 preferably has an adjustable waveform equalization function. The serializer 13 and the de-serializer 23 preferably receives a set value of a transmission distance and limits a waveform equalization function and an output signal amplitude in accordance with the set value. When a transmission distance is short, or waveform deterioration in a transmission path is small, power consumption and unnecessary radiation are preferably reduced by limiting a waveform equalization function and adjusting an output signal amplitude.

As a mode of providing the unpacker unit 21 of the video signal receiving device 20 with the set value N for the number of pixels and the set value M for the number of blocks, there are modes described below.

(1) In a first mode, the set value N for the number of pixels and the set value M for the number of blocks are provided to the unpacker unit 21 from the outside.

(2) In a second mode, the set value N for the number of pixels and the set value M for the number of blocks obtained based on a pulse width (a time width of the period K) of a control signal (Control(D/K)) reproduced by the decoder unit 22 are provided to the unpacker unit 21.

(3) In a third mode, the set value M for the number of blocks obtained based on a pulse width (a time width of the period K) of a control signal (Control(D/K)) reproduced by the decoder unit 22 and the set value N for the number of pixels obtained based on a block signal of the first period (the period K) of a control signal are provided to the unpacker unit 21.

FIG. 6 is a table that shows a relationship between the set value N for the number of pixels and the set value M for the number of blocks and a pulse width of a control signal in the second mode. The set value N [pixel/packet] of the number of pixels is a set value of the number of pixels per video signal (packet signal), and the set value M [block/pixel] of the number of blocks is a set value for the number of tone bits of a color signal in a pixel signal. In the second mode, a pulse width of a control signal is as large as the number of blocks corresponding to a product of the set value N for the number of pixels and the set value M for the number of blocks. Accordingly, in order to obtain the set value N for the number of pixels and the set value M for the number of blocks from a pulse width of a control signal when, for example, the set value M for the number of blocks is 5 at most, the set value N for the number of pixels is set to a power of two (1, 2, 4, 8, . . . ).

FIG. 7 is a table that shows a relationship between the set value N for the number of pixels and the set value M for the number of blocks and a pulse width of a control signal in the third mode. In the third mode, the set value N for the number of pixels and the set value M for the number of blocks can be obtained independently of each other, and there is no limitation like that in the second mode.

Figure 8:
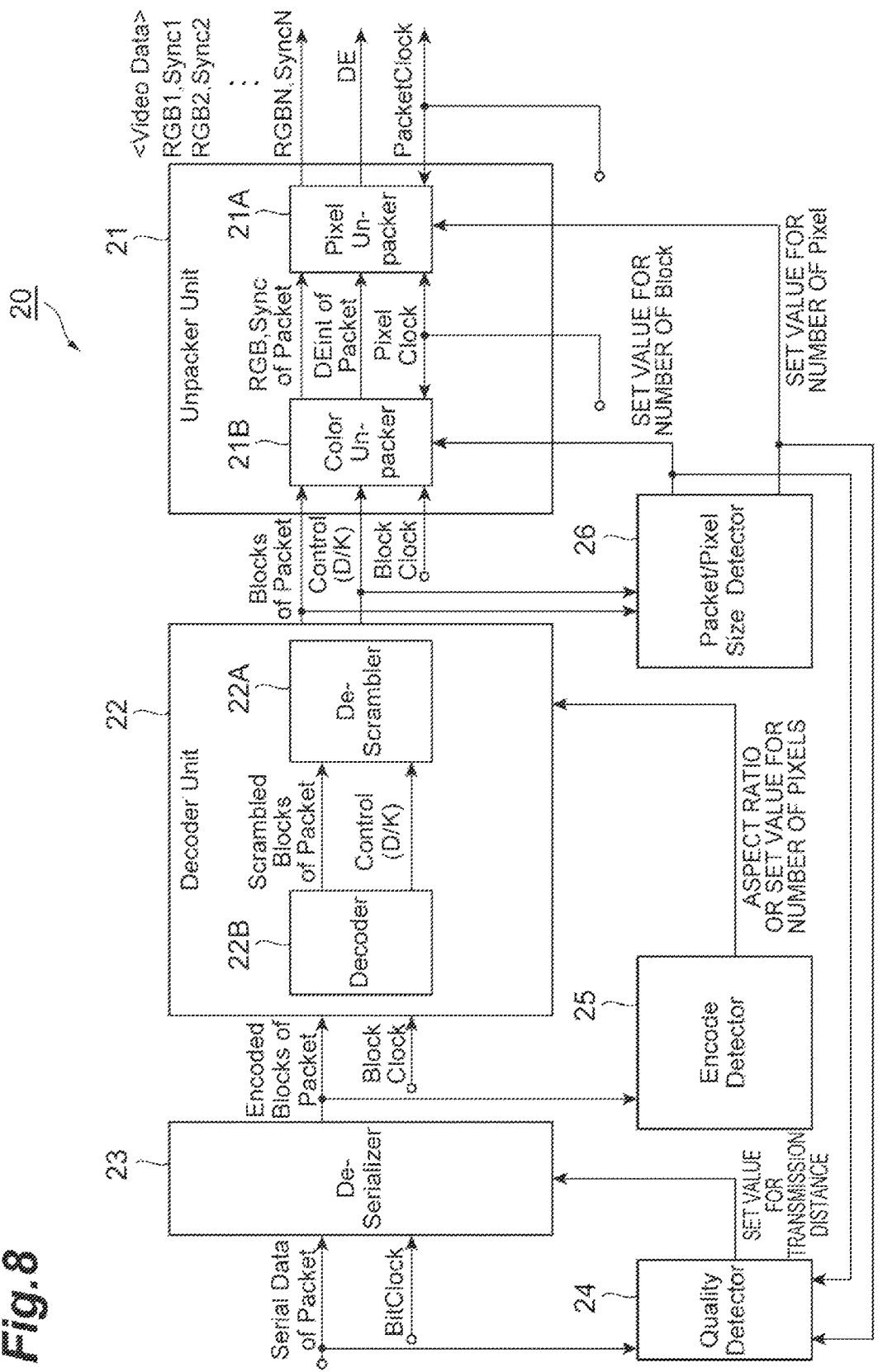
FIG. 8 is a diagram showing another configuration example of the video signal receiving device 20 according to the present embodiment.

FIG. 8 is a diagram showing another configuration example of the video signal receiving device 20. The video signal receiving device 20 shown in FIG. 8 further includes a quality detection unit (Quality Detector) 24, an encoding detection unit (Encode Detector) 25, and a size detection unit (Packet/Pixel Size Detector) 26 in addition to the configuration shown in FIG. 4. The video signal receiving device 20 shown in FIG. 8 detects quality of a received serial signal by using the quality detection unit 24, detects an amount of information (an aspect ratio or a set value for the number of pixels of the display 30) of a video signal by using the encoding detection unit 25, and detects the set value N for the number of pixels and the set value M for the number of blocks corresponding to the second mode or the third mode by using the size detection unit 26.

The quality detection unit 24 determines quality of a received serial signal, detects quality of a transmission path based on the set value N for the number of pixels and the set value M for the number of blocks in addition to a result of the determination of quality, and provides the de-serializer 23 with a result of the detection (a set value for a transmission distance). Upon receiving a result of detection performed by the quality detection unit 24, the de-serializer 23 limits a waveform equalization function and adjusts an output signal amplitude.

Figure 9:
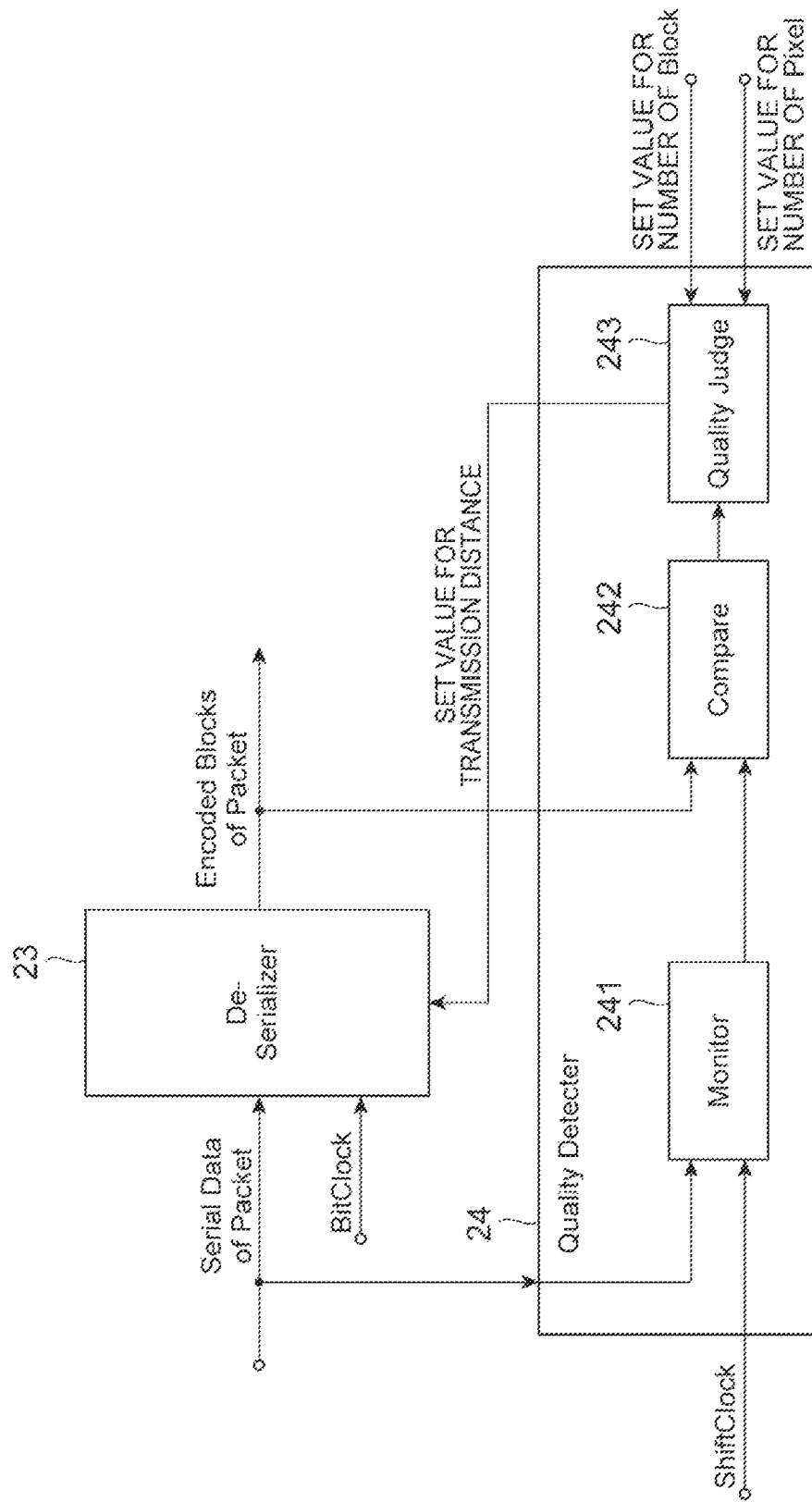
FIG. 9 is a diagram showing a configuration example of a quality detection unit 24.

FIG. 9 is a diagram showing a configuration example of the quality detection unit 24. This diagram also shows the de-serializer 23. The quality detection unit 24 includes a monitoring part (Monitor) 241, a comparison part (Compare) 242, and a quality determination part (Quality Judge) 243. The monitoring part 241, which has a configuration similar to that of the de-serializer 23, receives input of a clock (Shift Clock) obtained by shifting a phase of a clock provided to the de-serializer 23, and acquires data by changing a phase of a clock for sampling a serial signal (Serial Data of Packet). The comparison part 242 compares an encoded block signal (Encoded Blocks of Packet) outputted from the de-serializer 23 and an output signal of the monitoring part 241.

Based on a result of the comparison performed by the comparison part 242, the quality determination part 243 can determine that transmission quality is excellent when a section, in which values of both of the signals are the same, is large, and can determine that transmission quality is poor when such a section is small. That the set value N for the number of pixels and the set value M for the number of blocks are large means that an amount of transmission data per unit time is large. When an amount of transmission data per unit time is large, a required level of transmission quality is increased. Accordingly, the quality determination part 243 can determine that transmission quality is excellent when an amount of transmission data per unit time is relatively small, and can determine that transmission quality is poor when an amount of transmission data per unit time is relatively large.

The encoding detection unit 25 detects an amount of information (an aspect ratio or a set value for the number of pixels) of a video signal based on an encoded block signal (Encoded Blocks of Packet) outputted from the de-serializer 23, and provides the decoder unit 22 with a result of the detection.

Figure 10:
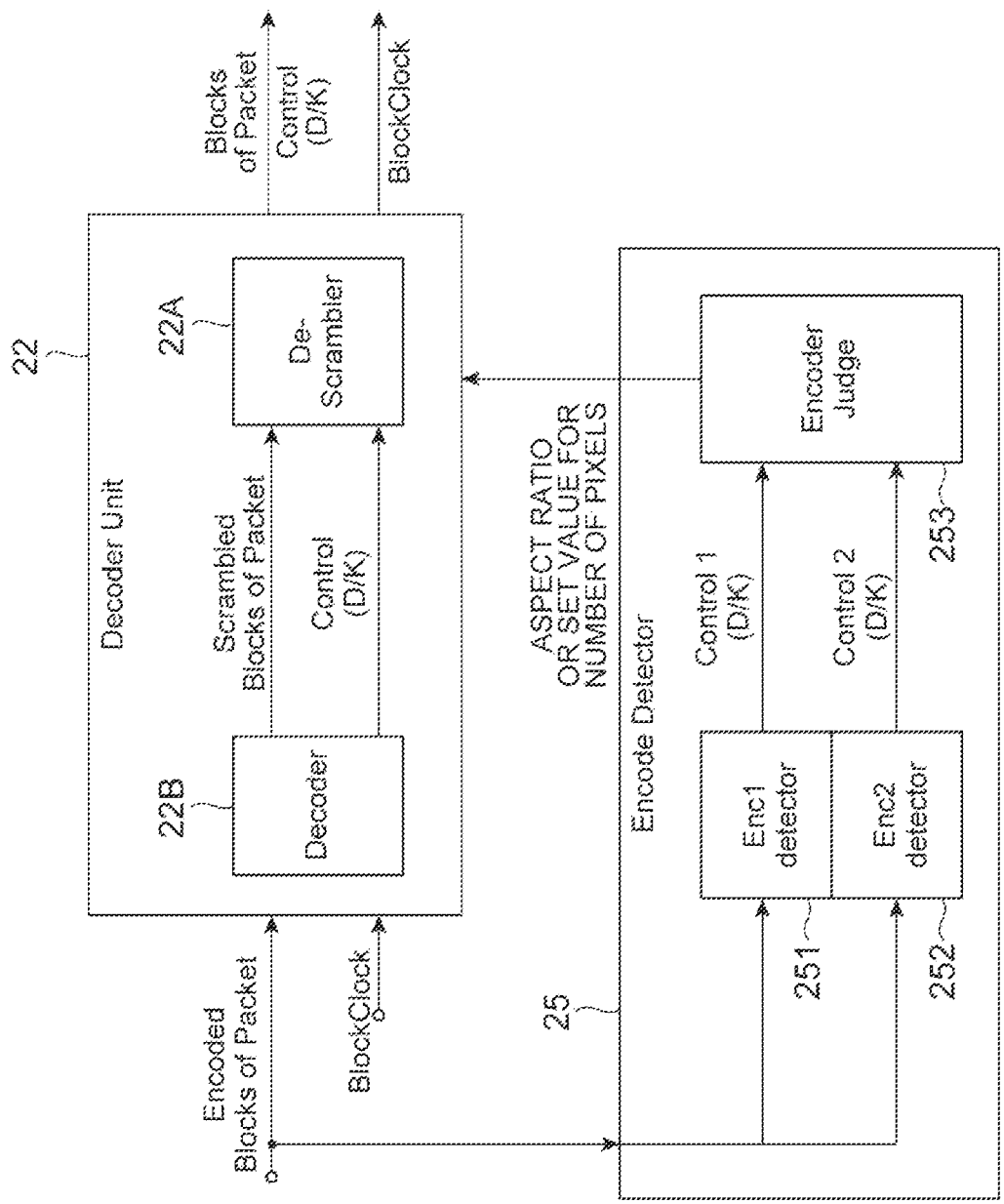
FIG. 10 is a diagram showing a configuration example of an encoding detection unit 25.

FIG. 10 is a diagram showing a configuration example of the encoding detection unit 25. This diagram also shows the decoder unit 22. The encoding detection unit 25 includes an End detector (Enc1 detector) 251, an Enc2 detector (Enc2 detector) 252, and an encoder determination part (Encoder Judge) 253. The End detector 251 and the Enc2 detector 252 detect a type of encoding processing of an encoded block signal. The encoder determination part 253 can read an amount of information (an aspect ratio or a set value for the number of pixels) of a video signal by distinguishing the first period and the second period, to which encoding processing is applied differently, based on a result of the detection (Control 1(D/K), Control 2(D/K)) performed by the Enc1 detector 251 and the Enc2 detector 252.

The size detection unit 26 receives input of a control signal (Control(D/K)) reproduced by the decoder unit 22, and detects the set value N for the number of pixels and the set value M for the number of blocks based on a pulse width (a time width of the period K) of the control signal by the method of the second mode described above. Alternatively, the size detection unit 26 receives input of a block signal (Blocks of Packet) and a control signal (Control(D/K)) reproduced by the decoder unit 22, and detects the set value M for the number of blocks based on a pulse width (a time width of the period K) of the control signal and the set value N for the number of pixels based on a block signal of the first period (period K) of the control signal by the method according to the third mode described above. The size detection unit 26 then provides the unpacker unit 21 and the quality detection unit 24 with the set value N for the number of pixels and the set value M for the number of blocks that have been detected.

Next, a description will be made on a preferred embodiment of a configuration for transmitting the set value N for the number of pixels and the set value M for the number of blocks from the video signal transmission device 10 to the video signal receiving device 20 by the method according to the second mode described above with reference to FIGS. 11, 12A to 12E, and 13.

Figure 11:
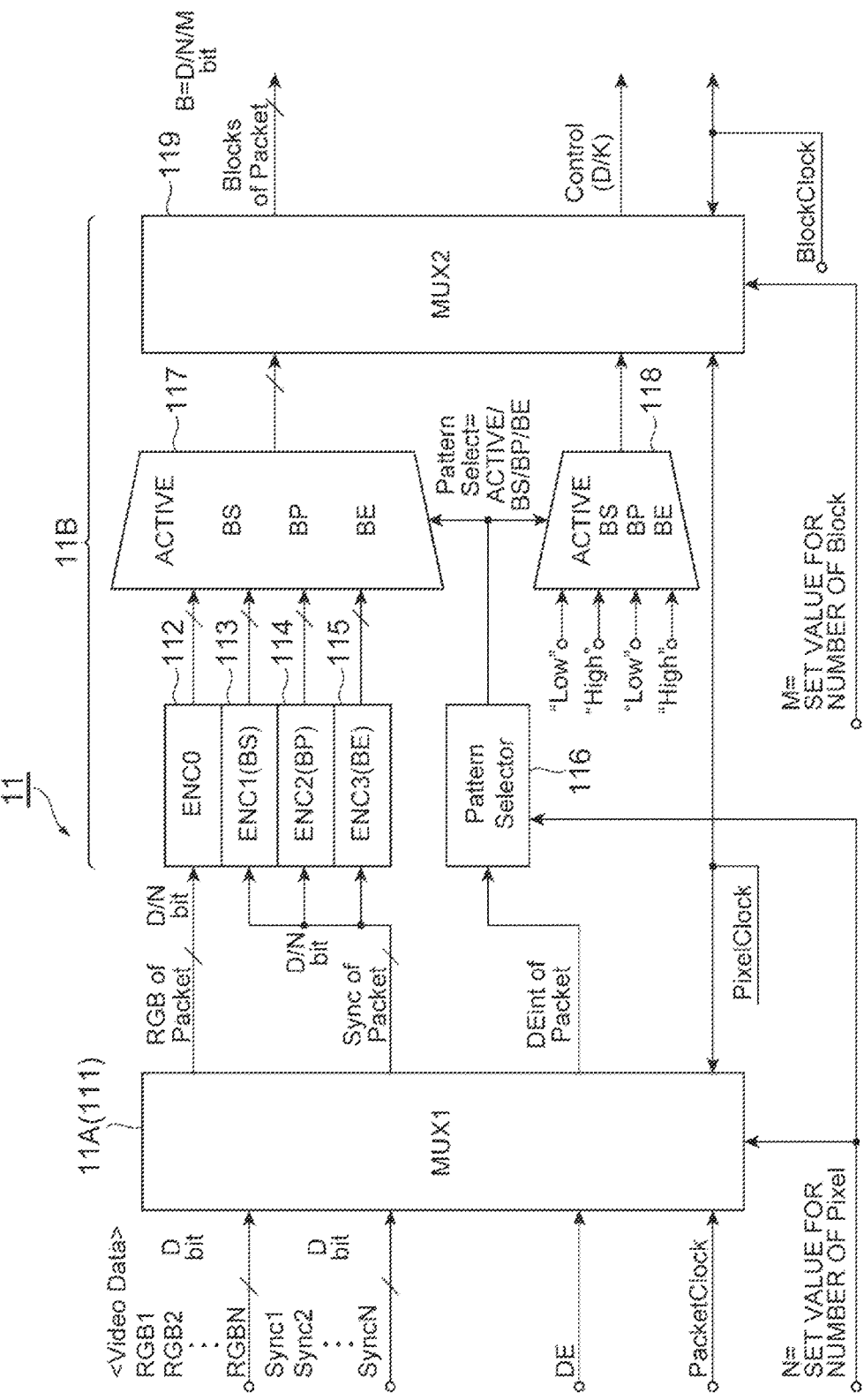
FIG. 11 is a diagram showing a configuration of a packer unit 11 in the video signal transmission device 10.

FIG. 11 is a diagram showing a configuration example of the packer unit 11 in the video signal transmission device 10. FIGS. 12A to 12E are timing charts of signals in the packer unit 11 of the video signal transmission device 10. The packer unit 11 includes an MUX 111 (MUX1), encoders 112 to 115 (ENC0, ENC1 (BS), ENC2 (BP), ENC3 (BE)), a pattern selection part (Pattern Selector) 116, a selection part 117, a selection part 118, and an MUX 119 (MUX2). Among the above, the MUX 111 constitutes the pixel packer 11A. The encoders 112 to 115, the pattern selection part 116, the selection part 117, the selection part 118, and the MUX 119 constitute the color packer 11B.

Figure 12:
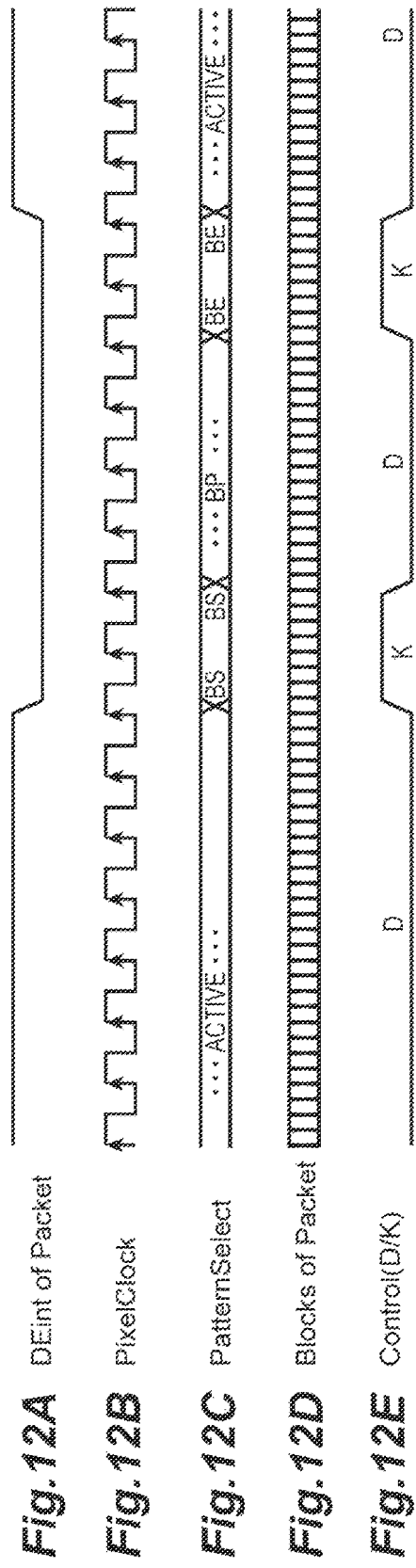
FIGS. 12A to 12E are timing charts of signals in the packer unit 11 of the video signal transmission device 10.

The MUX 111 receives input of color signals (RGB1 to RGBN) and sync signals (Sync1 to SyncN) constituting a video signal having the number N of pixels, a data enable signal (DE), and the set value N for the number of pixels. The MUX 111 multiplexes (N-multiplexing) the color signals (RGB1 to RGBN) for the number N of pixels, and outputs the multiplexed color signal (RGB of Packet) to the encoder 112. The MUX 111 multiplexes (N-multiplexing) the sync signals (Sync1 to SyncN) for the number N of pixels, and outputs the multiplexed sync signal (Sync of Packet) to the encoders 113 to 115. The MUX 111 outputs the data enable signal (DEint of Packet) to the pattern selection part 116 (FIG. 12A).

The encoder 112 applies encoding processing to the multiplexed color signal (RGB of Packet) outputted from the MUX 111, and outputs the processed signal to the selection part 117. The encoders 113 to 115 apply encoding processing to the multiplexed sync signal (Sync of Packet) outputted from the MUX 111, and outputs the processed signal to the selection part 117.

The pattern selection part 116 receives input of the data enable signal (DEint of Packet) outputted from the MUX 111, and also receives input of the set value N for the number of pixels. The pattern selection part 116 then detects a timing of a rising transition and a timing of a falling transition of the data enable signal, and generates a pattern selection signal (Pattern Select) (FIG. 12C). The pattern selection part 116 provides the selection part 117 and the selection part 118 with the pattern selection signal.

The pattern selection signal shows active (Active) in a period in which the data enable signal is at a high level. The pattern selection signal shows blank start (BS) in a period corresponding to the set value M for the number of blocks after the falling transition timing of the data enable signal. The pattern selection signal shows blank end (BE) in a period corresponding to the set value M for the number of blocks before the rising transition timing of the data enable signal. The pattern selection signal shows blank (BP) in a period after the blank start (BS) and before the blank end (BE).

The selection part 117 receives signals outputted from the encoders 112 to 115, and also receives input of a pattern signal outputted from the pattern selection part 116. When the pattern signal shows active (Active), the selection part 117 selects a signal outputted from the encoder 112 and outputs the signal to the MUX 119. When the pattern signal shows blank start (BS), the selection part 117 selects a signal outputted from the encoder 113 and outputs the signal to the MUX 119. When the pattern signal shows blank (BP), the selection part 117 selects a signal outputted from the encoder 114 and outputs the signal to the MUX 119. When the pattern signal shows blank end (BE), the selection part 117 selects a signal outputted from the encoder 115 and outputs the signal to the MUX 119.

The selection part 118 receives input of two signals D (for example, signals at a low level) and two signals K (for example, signals at a high level), and also receives input of a pattern signal outputted from the pattern selection part 116. When the pattern signal shows active (Active), the selection part 118 selects the signals D at a low level, and outputs the signals D to the MUX 119. When the pattern signal shows blank start (BS), the selection part 118 selects the signals K at a high level and outputs the signals K to the MUX 119. When the pattern signal shows blank (BP), the selection part 118 selects a signal D at a low level and outputs the signal D to the MUX 119. When the pattern signal shows blank end (BE), the selection part 118 selects the signals K at a high level and outputs the signals K to the MUX 119. A signal outputted from the selection part 118 is a control signal (Control(D/K)) (FIG. 12E).

The MUX 119 receives input of a signal outputted from the selection part 117 and also receives input of the set value M for the number of blocks in synchronization with a pixel clock (Pixel Clock, FIG. 12B). The MUX 119 then multiplexes (M-multiplexing) the signal outputted from the selection part 117, and outputs the multiplexed signal as a block signal (Blocks of Packet) (FIG. 12D). The MUX 119 also outputs a control signal (Control(D/K)) (FIG. 12E).

The control signal outputted from the MUX 119 is a signal including a pulse of a pulse width corresponding to a product of the set value N for the number of pixels and the set value M for the number of blocks.

Figure 13:
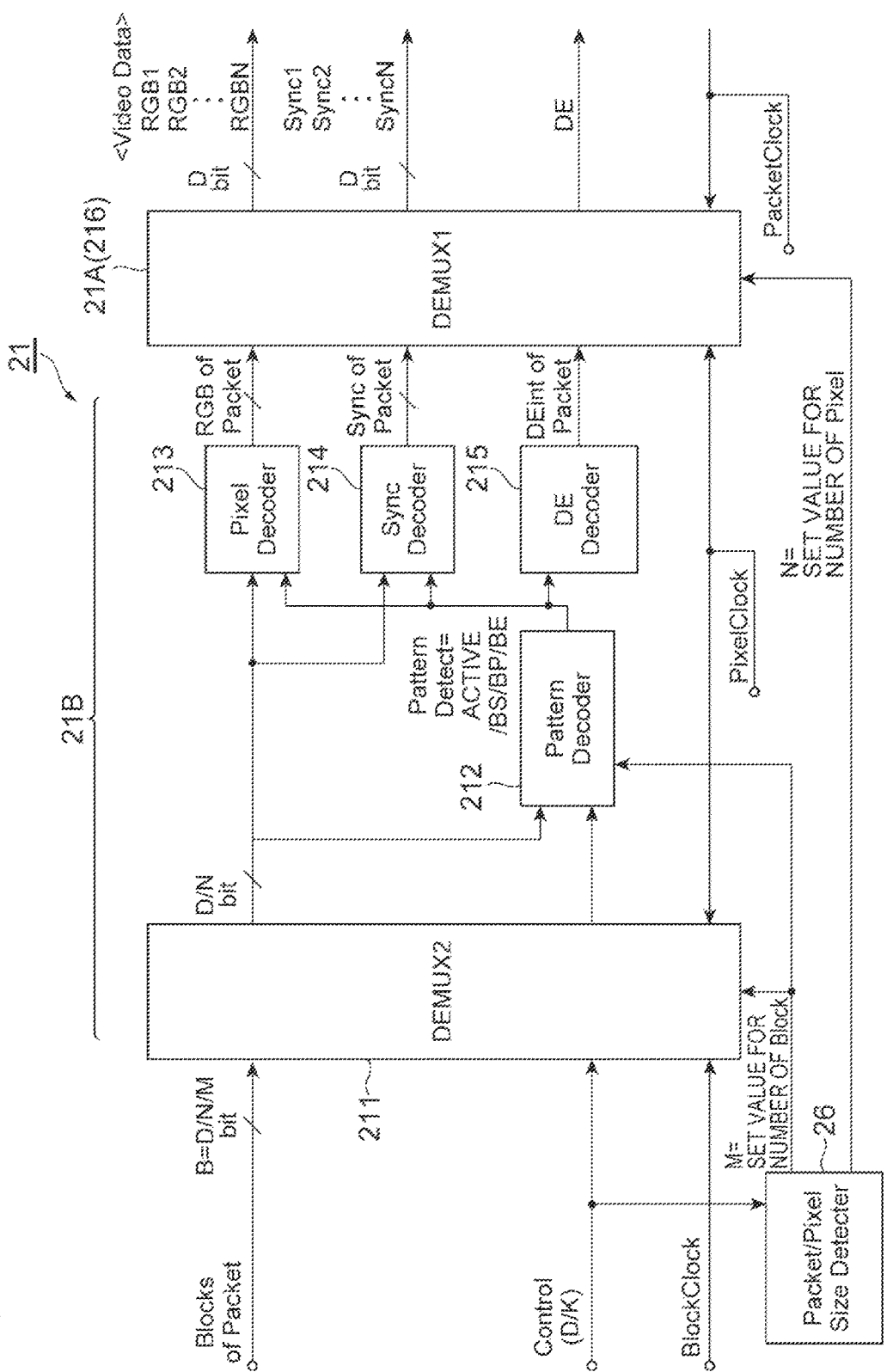
FIG. 13 is a diagram showing a configuration of the unpacker unit 21 in the video signal receiving device 20.

FIG. 13 is a diagram showing a configuration example of the unpacker unit 21 in the video signal receiving device 20. This diagram also shows the size detection unit 26. The unpacker unit 21 includes a DEMUX 211 (DEMUX2), a pattern decoder (Pattern Decoder) 212, a pixel decoder (Pixel Decoder) 213, a sync decoder (Sync Decoder) 214, a DE decoder (DE Decoder) 215, and a DEMUX 216 (DEMUX1). Among the above, the DEMUX 216 constitutes the pixel unpacker 21A. The DEMUX 211, the pattern decoder 212, the pixel decoder 213, and the sync decoder 214 constitute the color unpacker 21B.

The size detection unit 26 receives input of a control signal (Control(D/K)) reproduced by the decoder unit 22, and detects the set value N for the number of pixels and the set value M for the number of blocks based on a pulse width (a time width of the period K) of the control signal by the method of the second mode described above. The size detection unit 26 then provides the unpacker unit 21 and the quality detection unit 24 with the set value N for the number of pixels and the set value M for the number of blocks that have been detected.

The DEMUX 211 receives input of a block signal (Blocks of Packet) and a control signal (Control(D/K)) reproduced by the decoder unit 22, and also receives input of the set value M for the number of blocks. The DEMUX 211 then divides the block signal into M pieces, and outputs them to the pattern decoder 212, the pixel decoder 213, and the sync decoder 214. The DEMUX 211 also outputs the control signal to the pattern decoder 212.

The pattern decoder 212 receives input of the block signal divided into M pieces and the control signal (Control(D/K)) outputted from the DEMUX 211, and also receives input of the set value M for the number of blocks. The pattern decoder 212 outputs a pattern detection signal (Pattern Detect) based on these input signals. The pattern detection signal shows any of active (Active), blank start (BS), blank (BP), and blank end (BE), like a pattern selection signal. The pattern decoder 212 outputs the pattern detection signal to the pixel decoder 213, the sync decoder 214, and the DE decoder 215.

The pixel decoder 213 receives input of the block signal divided into M pieces outputted from the DEMUX 211, and also receives input of the pattern detection signal outputted from the pattern decoder 212. When the pattern detection signal shows active (Active), the pixel decoder 213 decodes the block signal divided into M pieces, and reproduces a packetized color signal (RGB of Packet).

The sync decoder 214 receives input of the block signal divided into M pieces outputted from the DEMUX 211, and also receives input of the pattern detection signal outputted from the pattern decoder 212. When the pattern detection signal shows any of blank start (BS), blank (BP), and blank end (BE), the pixel decoder 213 decodes the block signal divided into M pieces, and reproduces a packetized sync signal (Sync of Packet).

The DE decoder 215 receives input of the pattern detection signal outputted from the pattern decoder 212. The DE decoder 215 reproduces the data enable signal (DEint of Packet) based on the pattern detection signal.

The DEMUX 216 receives the packetized color signal (RGB of Packet) reproduced by the pixel decoder 213, the packetized sync signal (Sync of Packet) reproduced by the sync decoder 214, and the data enable signal (DEint of Packet) reproduced by the DE decoder 215, and also receives input of the set value N for the number of pixels. The DEMUX 216 then divides the input color signal (RGB of Packet) into N pieces to reproduce color signals (RGB1 to RGBN) for the number N of pixels, and also divides the sync signal (Sync of Packet) into N pieces to reproduce sync signals (Sync1 to SyncN) for the number N of pixels. The DEMUX 216 also outputs the data enable signal (DE).

Next, a description will be made on a preferred embodiment of a configuration for transmitting the set value N for the number of pixels and the set value M for the number of blocks from the video signal transmission device 10 to the video signal receiving device 20 by the method according to the third mode described above with reference to FIGS. 14, 15A to 15E, and 16.

Figure 14:
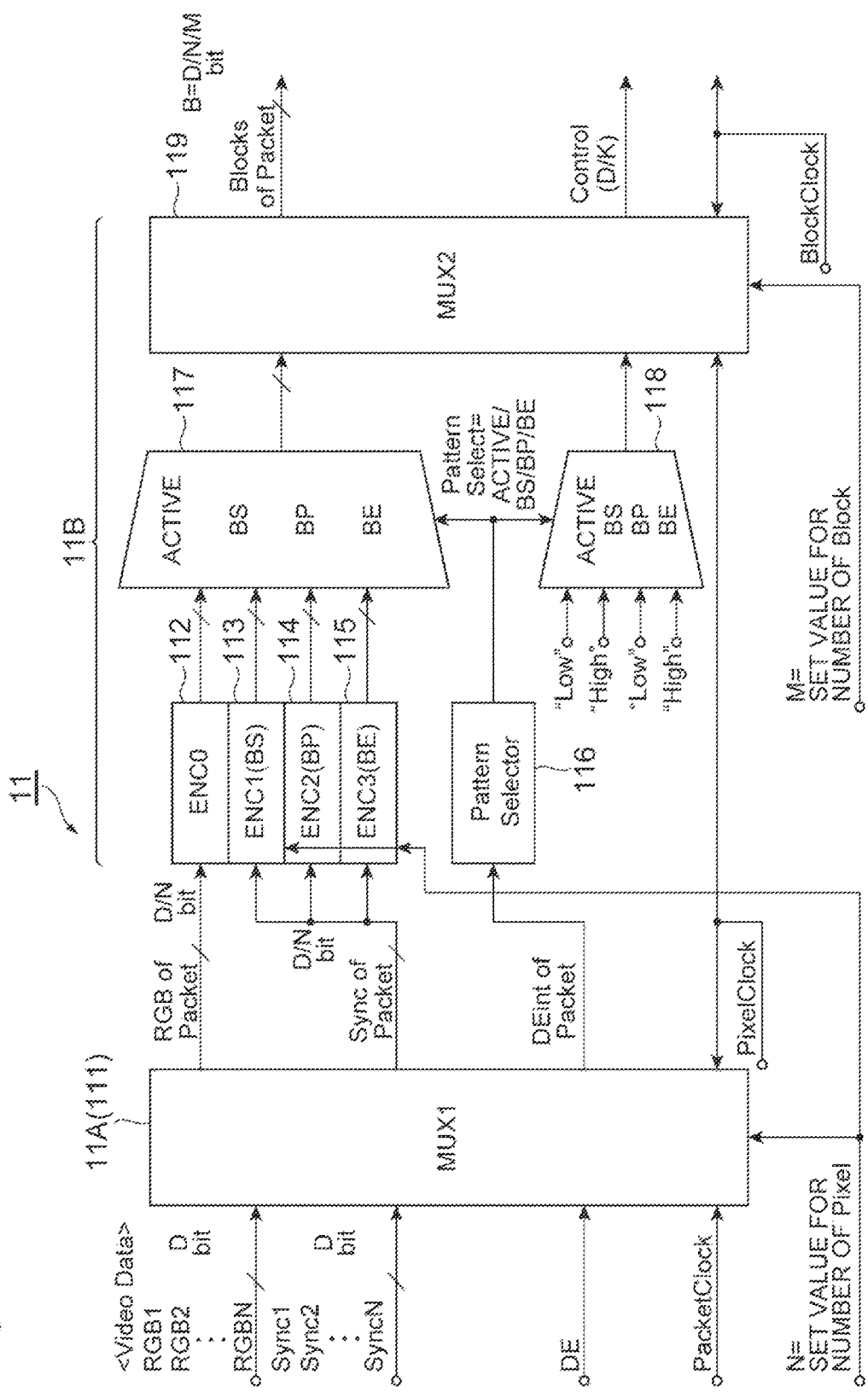
FIG. 14 is a diagram showing a configuration example of the packer unit 11 in the video signal transmission device 10.

FIG. 14 is a diagram showing a configuration example of the packer unit 11 in the video signal transmission device 10. FIGS. 15A to 15E are timing charts of signals in the packer unit 11 of the video signal transmission device 10. FIG. 16 is a diagram showing a configuration example of the unpacker unit 21 in the video signal receiving device 20. Hereinafter, a difference from the second mode will be mainly described.

The third mode is different from the second mode shown in FIG. 11 with respect to the point that the set value N for the number of pixels is provided also to the encoder 113 and the encoder 115 of the packer unit 11 as shown in FIG. 14. When applying encoding processing to the multiplexed sync signal (Sync of Packet) outputted from the MUX 111 (MUX1), the encoders 113 and 115 include information of the set value N for the number of pixels into the processed signal. The signal including the information of the set value N for the number of pixels is outputted as a block signal (Blocks of Packet) from the MUX 119 (MUX2) in the first period (period K) in which a pulse exists of the control signal (Control(D/K)).

Figure 15:
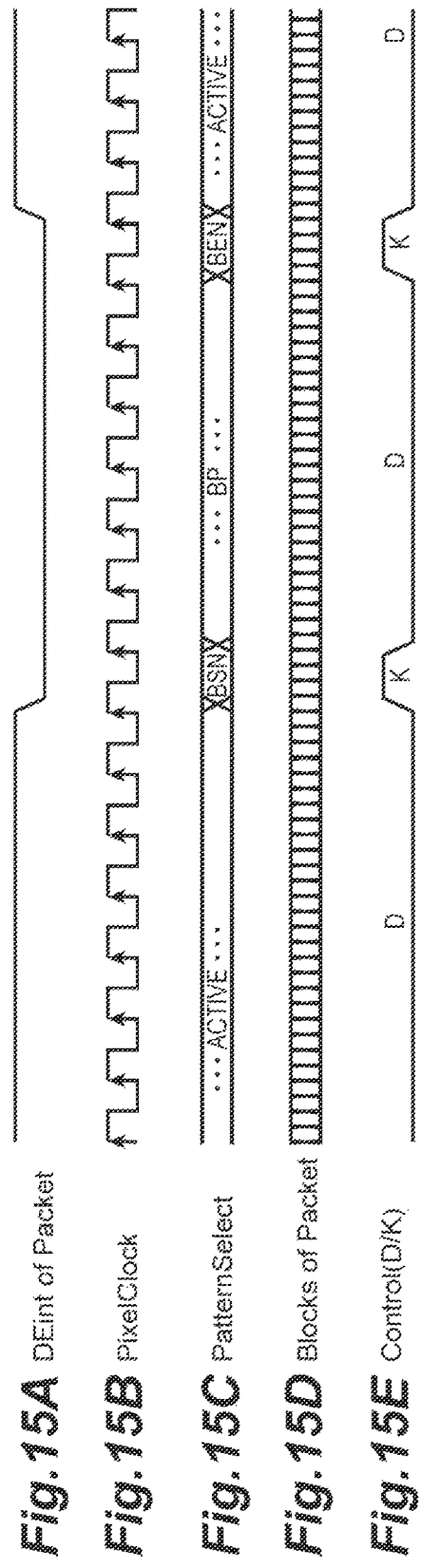
FIGS. 15A to 15E are timing charts of signals in the packer unit 11 of the video signal transmission device 10.
Figure 16:
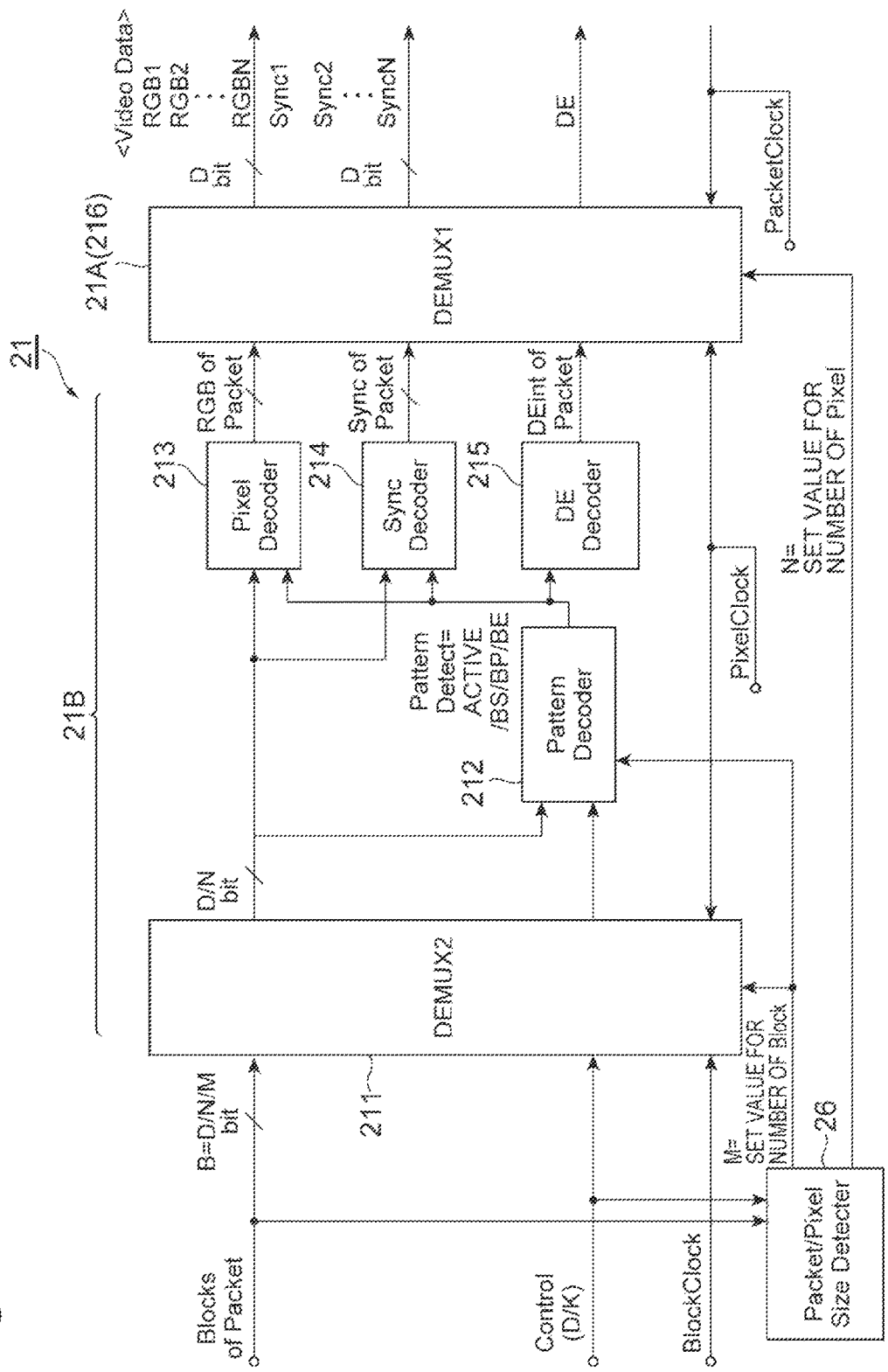
FIG. 16 is a diagram showing a configuration example of the unpacker unit 21 in the video signal receiving device 20.

In the third mode, in the pattern selection signal (Pattern Select) outputted from the pattern selection part 116 of the packer unit 11 as shown in FIG. 14, a length of periods (BSN, BEN) shown by blank start (BS) and blank end (BE) has a constant value that does not depend on the set value N for the number of pixels (FIG. 15C). In this manner, the control signal (Control(D/K)) outputted from the MUX 119 is a signal including a pulse having a pulse width corresponding to the set value M for the number of blocks (FIG. 15E). Time charts of signals shown in FIGS. 15A, 15B, and 15D match with time charts of signals shown in FIGS. 12A, 12B, and 12D, respectively.

The third embodiment is different from the second mode shown in FIG. 13 with respect to the point that the size detection unit 26 receives input of the block signal (Blocks of Packet) and the control signal (Control(D/K)) reproduced by the decoder unit 22 as shown in FIG. 16. In the method of the third mode described above, the set value M for the number of blocks is detected based on a pulse width (a time width of the period K) of a control signal, and the set value N for the number of pixels is detected based on a block signal in the first period (period K) of a control signal. The size detection unit 26 then provides the unpacker unit 21 and the quality detection unit 24 with the set value N for the number of pixels and the set value M for the number of blocks that have been detected.

In the embodiment described above, even when the number of pixels or the number of tones is large, a video signal is applied with packetizing processing into a packet configuration having size corresponding to the set value N for the number of pixels and the set value M for the number of blocks, and the packetized signal is transmitted from the video signal transmission device 10 to the video signal receiving device 20. Accordingly, increase in the number of wires between the video signal transmission device 10 and the video signal receiving device 20 can be restricted.

Further, since an encoding efficiency and a decoding efficiency are selected in accordance with an aspect ratio or the number of pixels, increase in the number of wires between the video signal transmission device 10 and the video signal receiving device 20 can be restricted, and optimization of a data transmission rate can be achieved. Moreover, since a waveform equalization function or an output signal amplitude adjusting function is limited or adjusted in accordance with a transmission distance and transmission path quality, power consumption and unnecessary radiation can be reduced.

In the present embodiment, a variety of required specifications can be supported, and a common board and the like can be easily used for a variety of required specifications. Accordingly, the video signal transmission system 1 can be configured inexpensively.

REFERENCE SIGNS LIST

1 . . . Video signal transmission system; 10 . . . Video signal transmission device; 11 . . . Packer unit;

11A . . . Pixel packer; 11B . . . Color packer; 12 . . . Encoder unit; 12A . . . Scrambler; 12B . . . Encoder; 13 . . . Serializer, 20 . . . Video signal receiving device; 21 . . . Unpacker unit; 21A . . . Pixel unpacker, 21B . . . Color unpacker; 22 . . . Decoder unit; 22A . . . De-scrambler; 22B . . . Decoder; 23 . . . De-serializer; 24 . . . Quality detection unit; 25 . . . Encoding detection unit; 26; . . . Size detection unit; 111 . . . MUX; 112 to 115 . . . Encoder; 116 . . . Pattern selection part; 117 . . . Selection part; 118 . . . Selection part; 119 . . . MUX; 211 . . . DEMUX; 212 . . . Pattern decoder; 213 . . . Pixel decoder; 214 . . . Sync decoder; 215 . . . DE decoder; 216 . . . DEMUX; 241 . . . Monitoring part; 242 . . . Comparison part; 243 . . . Quality determination part; 251 . . . Enc1 detector; 252 . . . Enc2 detector; and 253 . . . Encoder determination part.

The invention claimed is:

1. A video signal transmission device, comprising:
a packer unit configured to capture a data enable signal and a video signal constituted by one or more pixel signals, each of which corresponds to one pixel and includes a color signal and a sync signal, and apply packetizing processing to the video signal in accordance with the data enable signal so that the video signal has a packet configuration of size corresponding to the number of pixels per video signal and the number of tone bits of the color signal to generate a plurality of block signals;
an encoder unit configured to apply encoding processing to the plurality of block signals to generate a plurality of encoded block signals; and
a serializer configured to apply parallel-serial conversion to the plurality of encoded block signals to generate a serial signal, wherein
the packer unit generates a control signal including a pulse having a pulse width corresponding to the number of pixels and the number of tone bits of the color signal, and
the encoder unit applies encoding processing of encoding efficiencies different between a first period of the control signal in which the pulse exists and a second period of the control signal distinguished from the first period depending on existence or non-existence of the pulse.

2. A video signal transmission device, comprising:
a packer unit configured to capture a data enable signal and a video signal constituted by one or more pixel signals, each of which corresponds to one pixel and includes a color signal and a sync signal, and apply packetizing processing to the video signal in accordance with the data enable signal so that the video signal has a packet configuration of size corresponding to the number of pixels per video signal and the number of tone bits of the color signal to generate a plurality of block signals;
an encoder unit configured to apply encoding processing to the plurality of block signals to generate a plurality of encoded block signals; and
a serializer configured to apply parallel-serial conversion to the plurality of encoded block signals to generate a serial signal, wherein
the packer unit generates a control signal including a pulse having a pulse width corresponding to the number of tone bits of the color signal, and each of block signals generated in a first period of the control signal, in which a pulse exists, among the plurality of block signals includes information on the number of pixels, and
the encoder unit applies encoding processing of encoding efficiencies different between the first period of the control signal and a second period of the control signal distinguished from the first period depending on existence or non-existence of the pulse.

3. The video signal transmission device according to claim 1, wherein
the encoder unit comprises:
a scrambler configured to apply scrambling processing only in the second period to the plurality of block signals; and
an encoder configured to apply encoding processing of encoding efficiencies different between the first period and the second period to the plurality of block signals to which the scrambling processing has been applied.

4. The video signal transmission device according to claim 1, wherein
the encoder unit selects any of a plurality of encoding efficiencies set in advance for the encoding processing.

5. The video signal transmission device according to claim 1, wherein
the serializer has a waveform equalization function or an output signal amplitude adjusting function.

6. A video signal receiving device, comprising:
a de-serializer configured to capture a serial signal outputted from the video signal transmission device according to claim 1, and apply serial-parallel conversion to the serial signal to reproduce a plurality of encoded block signals;
a decoder unit configured to apply decoding processing to the plurality of encoded block signals to reproduce a plurality of block signals; and
an unpacker unit configured to reproduce a video signal constituted by one or more pixel signals, each of which corresponds to one pixel and includes a color signal and a sync signal, and a data enable signal by applying unpacketizing processing to the plurality of block signals, wherein
the decoder unit identifies an encoded block signal of a first period and an encoded block signal of a second period, the encoded block signals to which encoding processing of different encoding efficiencies have been applied, among the plurality of encoded block signals, reproduces a control signal including a pulse having a pulse width corresponding to the first period, and applies decoding processing of decoding efficiencies different between the first period and the second period to the plurality of encoded block signals, and
the unpacker unit performs unpacketizing processing by using set values for the number of pixels per video signal and the number of tone bits of the color signal.

7. A video signal receiving device, comprising:
a de-serializer configured to capture a serial signal outputted from the video signal transmission device according to claim 1, and apply serial-parallel conversion to the serial signal to reproduce a plurality of encoded block signals;
a decoder unit configured to apply decoding processing to the plurality of encoded block signals to generate a plurality of block signals; and
an unpacker unit configured to reproduce a video signal constituted by one or more pixel signals, each of which corresponds to one pixel and includes a color signal and a sync signal, and a data enable signal by applying unpacketizing processing to the plurality of block signals, wherein the decoder unit identifies an encoded block signal of a first period and an encoded block signal of a second period, the encoded block signals to which encoding processing of different encoding efficiencies have been applied, among the plurality of encoded block signals, reproduces a control signal including a pulse having a pulse width corresponding to the first period, and applies decoding processing of decoding efficiencies different between the first period and the second period to the plurality of encoded block signals, and the unpacker unit performs unpacketizing processing by using the number of pixels per video signal and the number of tone bits of the color signal obtained from a pulse width of the pulse in the control signal.

8. A video signal receiving device, comprising:
a de-serializer configured to capture a serial signal outputted from the video signal transmission device according to claim 2, and apply serial-parallel conversion to the serial signal to reproduce a plurality of encoded block signals;
a decoder unit configured to apply decoding processing to the plurality of encoded block signals to generate a plurality of block signals; and
an unpacker unit configured to reproduce a video signal constituted by one or more pixel signals, each of which corresponds to one pixel and includes a color signal and a sync signal, and a data enable signal by applying unpacketizing processing to the plurality of block signals, wherein the decoder unit identifies an encoded block signal of a first period and an encoded block signal of a second period, the encoded block signals to which encoding processing of different encoding efficiencies have been applied, among the plurality of encoded block signals, reproduces a control signal including a pulse having a pulse width corresponding to the first period, and applies decoding processing of decoding efficiencies different between the first period and the second period to the plurality of encoded block signals, and the unpacker unit performs unpacketizing processing by using the number of tone bits of the color signal obtained from a pulse width of the pulse in the control signal and the number of pixels per video signal obtained from a block signal of the first period among the plurality of block signals.

9. The video signal receiving device according to claim 6, wherein
the decoder unit comprises:
a decoder configured to apply decoding processing of decoding efficiencies different between the first period and the second period to the plurality of encoded block signals; and
a de-scrambler configured to apply de-scrambling processing only in the second period to the plurality of encoded block signals to which the decoding processing has been applied.

10. The video signal receiving device according to claim 6, wherein
the decoder unit selects any of a plurality of decoding efficiencies set in advance for the decoding processing.

11. The video signal receiving device according to claim 6, wherein
the de-serializer has a waveform equalization function.

12. A video signal transmission system, comprising:
the video signal transmission device according to claim 1; and
a video signal receiving device, wherein
the video signal receiving device comprises:
a de-serializer configured to capture a serial signal outputted from the video signal transmission device according to claim 1, and apply serial-parallel conversion to the serial signal to reproduce a plurality of encoded block signals;
a decoder unit configured to apply decoding processing to the plurality of encoded block signals to reproduce a plurality of block signals; and
an unpacker unit configured to reproduce a video signal constituted by one or more pixel signals, each of which corresponds to one pixel and includes a color signal and a sync signal, and a data enable signal by applying unpacketizing processing to the plurality of block signals, wherein the decoder unit identifies an encoded block signal of a first period and an encoded block signal of a second period, the encoded block signals to which encoding processing of different encoding efficiencies have been applied, among the plurality of encoded block signals, reproduces a control signal including a pulse having a pulse width corresponding to the first period, and applies decoding processing of decoding efficiencies different between the first period and the second period to the plurality of encoded block signals, and the unpacker unit performs unpacketizing processing by using set values for the number of pixels per video signal and the number of tone bits of the color signal.

13. A video signal transmission system, comprising:
the video signal transmission device according to claim 2; and
a video signal receiving device, wherein
the video signal receiving device comprises:
a de-serializer configured to capture a serial signal outputted from the video signal transmission device according to claim 2, and apply serial-parallel conversion to the serial signal to reproduce a plurality of encoded block signals;
a decoder unit configured to apply decoding processing to the plurality of encoded block signals to reproduce a plurality of block signals; and
an unpacker unit configured to reproduce a video signal constituted by one or more pixel signals, each of which corresponds to one pixel and includes a color signal and a sync signal, and a data enable signal by applying unpacketizing processing to the plurality of block signals, wherein the decoder unit identifies an encoded block signal of a first period and an encoded block signal of a second period, the encoded block signals to which encoding processing of different encoding efficiencies have been applied, among the plurality of encoded block signals, reproduces a control signal including a pulse having a pulse width corresponding to the first period, and applies decoding processing of decoding efficiencies different between the first period and the second period to the plurality of encoded block signals, and the unpacker unit performs unpacketizing processing by using set values for the number of pixels per video signal and the number of tone bits of the color signal.

14. The video signal transmission device according to claim 2, wherein
the encoder unit comprises:
a scrambler configured to apply scrambling processing only in the second period to the plurality of block signals; and
an encoder configured to apply encoding processing of encoding efficiencies different between the first period and the second period to the plurality of block signals to which the scrambling processing has been applied.

15. The video signal transmission device according to claim 2, wherein
the encoder unit selects any of a plurality of encoding efficiencies set in advance for the encoding processing.

16. The video signal transmission device according to claim 2, wherein
the serializer has a waveform equalization function or an output signal amplitude adjusting function.

17. A video signal receiving device, comprising:
a de-serializer configured to capture a serial signal outputted from the video signal transmission device according to claim 2, and apply serial-parallel conversion to the serial signal to reproduce a plurality of encoded block signals;
a decoder unit configured to apply decoding processing to the plurality of encoded block signals to reproduce a plurality of block signals; and
an unpacker unit configured to reproduce a video signal constituted by one or more pixel signals, each of which corresponds to one pixel and includes a color signal and a sync signal, and a data enable signal by applying unpacketizing processing to the plurality of block signals, wherein
the decoder unit identifies an encoded block signal of a first period and an encoded block signal of a second period, the encoded block signals to which encoding processing of different encoding efficiencies have been applied, among the plurality of encoded block signals, reproduces a control signal including a pulse having a pulse width corresponding to the first period, and applies decoding processing of decoding efficiencies different between the first period and the second period to the plurality of encoded block signals, and
the unpacker unit performs unpacketizing processing by using set values for the number of pixels per video signal and the number of tone bits of the color signal.

18. The video signal receiving device according to claim 17, wherein
the decoder unit comprises:
a decoder configured to apply decoding processing of decoding efficiencies different between the first period and the second period to the plurality of encoded block signals; and
a de-scrambler configured to apply de-scrambling processing only in the second period to the plurality of encoded block signals to which the decoding processing has been applied.

19. The video signal receiving device according to claim 17, wherein
the decoder unit selects any of a plurality of decoding efficiencies set in advance for the decoding processing.

20. The video signal receiving device according to claim 17, wherein
the de-serializer has a waveform equalization function.

21. A video signal transmission system, comprising:
the video signal transmission device according to claim 1; and
the video signal receiving device, comprising:
a de-serializer configured to capture a serial signal outputted from the video signal transmission device according to claim 1, and apply serial-parallel conversion to the serial signal to reproduce a plurality of encoded block signals;
a decoder unit configured to apply decoding processing to the plurality of encoded block signals to generate a plurality of block signals; and
an unpacker unit configured to reproduce a video signal constituted by one or more pixel signals, each of which corresponds to one pixel and includes a color signal and a sync signal, and a data enable signal by applying unpacketizing processing to the plurality of block signals, wherein
the decoder unit identifies an encoded block signal of a first period and an encoded block signal of a second period, the encoded block signals to which encoding processing of different encoding efficiencies have been applied, among the plurality of encoded block signals, reproduces a control signal including a pulse having a pulse width corresponding to the first period, and applies decoding processing of decoding efficiencies different between the first period and the second period to the plurality of encoded block signals, and
the unpacker unit performs unpacketizing processing by using the number of pixels per video signal and the number of tone bits of the color signal obtained from a pulse width of the pulse in the control signal.

22. A video signal transmission system, comprising:
the video signal transmission device according to claim 2; and
the video signal receiving device, comprising:
a de-serializer configured to capture a serial signal outputted from the video signal transmission device according to claim 2, and apply serial-parallel conversion to the serial signal to reproduce a plurality of encoded block signals;
a decoder unit configured to apply decoding processing to the plurality of encoded block signals to generate a plurality of block signals; and
an unpacker unit configured to reproduce a video signal constituted by one or more pixel signals, each of which corresponds to one pixel and includes a color signal and a sync signal, and a data enable signal by applying unpacketizing processing to the plurality of block signals, wherein
the decoder unit identifies an encoded block signal of a first period and an encoded block signal of a second period, the encoded block signals to which encoding processing of different encoding efficiencies have been applied, among the plurality of encoded block signals, reproduces a control signal including a pulse having a pulse width corresponding to the first period, and applies decoding processing of decoding efficiencies different between the first period and the second period to the plurality of encoded block signals, and
the unpacker unit performs unpacketizing processing by using the number of tone bits of the color signal obtained from a pulse width of the pulse in the control signal and the number of pixels per video signal obtained from a block signal of the first period among the plurality of block signals.

* * * * *